US005608648A

United States Patent [19]

Sundt

[11] Patent Number: 5,608,648

[45] Date of Patent: Mar. 4, 1997

[54] METHOD AND APPARATUS FOR GENERATING PROFILES OF COOPERATING SCREW ROTORS

[76] Inventor: Cornelius V. Sundt, 27 Parkwood Dr., Windsor, Conn. 06095-3143

[21] Appl. No.: 342,231

[22] Filed: Nov. 18, 1994

[51] Int. Cl.[6] .............................. G06F 9/455; G06F 17/50

[52] U.S. Cl. .............................. 364/512

[58] Field of Search .............................. 364/578, 474.24, 364/512

[56] References Cited

U.S. PATENT DOCUMENTS

| | | | |
|---|---|---|---|
| 5,297,054 | 3/1994 | Kienzle et al. | 364/474.24 |
| 5,297,057 | 3/1994 | Kramer et al. | 364/578 |
| 5,453,934 | 9/1995 | Taghavi et al. | 364/474.24 |
| 5,455,778 | 10/1995 | Ide et al. | 364/578 |

*Primary Examiner*—Kevin J. Teska

*Assistant Examiner*—Matthew Loppnow

*Attorney, Agent, or Firm*—McCormick, Paulding & Huber

[57] ABSTRACT

Computer generated refined profiles for a pair of cooperating screw motors includes an initial profile for a female rotor and for a male rotor. The initial profiles are refined using an iterative procedure, and the female profile includes a groove having a leading flank comprising a generally circular arc connected to points which are developed by the iterative procedure to produce minimum clearances between these points and critical male points, such as the male tip and male root. The initial male profile is refined using the iterative procedure, and includes a surface generated to minimize the clearance with meshing female surfaces. The refined profiles, and a helix angle are used to define rotors having surfaces with pitch diameters located near a male root, thereby eliminating the "blow hole" leak and minimizing leak at the points where the female tip meshes near the male root.

18 Claims, 12 Drawing Sheets

10
12
14
16
18
20
22
24
26
28
32
33
34
40
42
44
46

Y
X
7
6
5
4
5
6
7
8
9
10
14
18
24
28
29
31
32
33
34
P

Y
8
7
6
5
4
5
6
7
8
9
10
X
18
28
33
34
50
52

Y
X
8
7
6
5
4
5
6
7
8
9
10
14
16
18
24
26
28
32
33
34
34
34
36
36
38
38
43
45
47
49

Y
X
8
7
6
5
4
5
6
7
8
9
10
14
α
34
18
32
28
24
38
48
44
50
52
34

Y
X
8
7
6
5
4
5
6
7
8
9
10
14
40
16
18
20
24
26
28
32
32
32
32
34

Y
X
8
7
6
5
4
5
6
7
8
9
10
14
18
24
28
16
33
34
49
50
52
58
60
R
R

Y
X
8
7
6
5
4
5
6
7
8
9
10
14
18
24
28
12
34
36
52
54
56
31
32
64
62

22
24
38
58
44
53
52
38
26
28
43
50
45
49
34
32
32
62
64
18
16
14
12
42

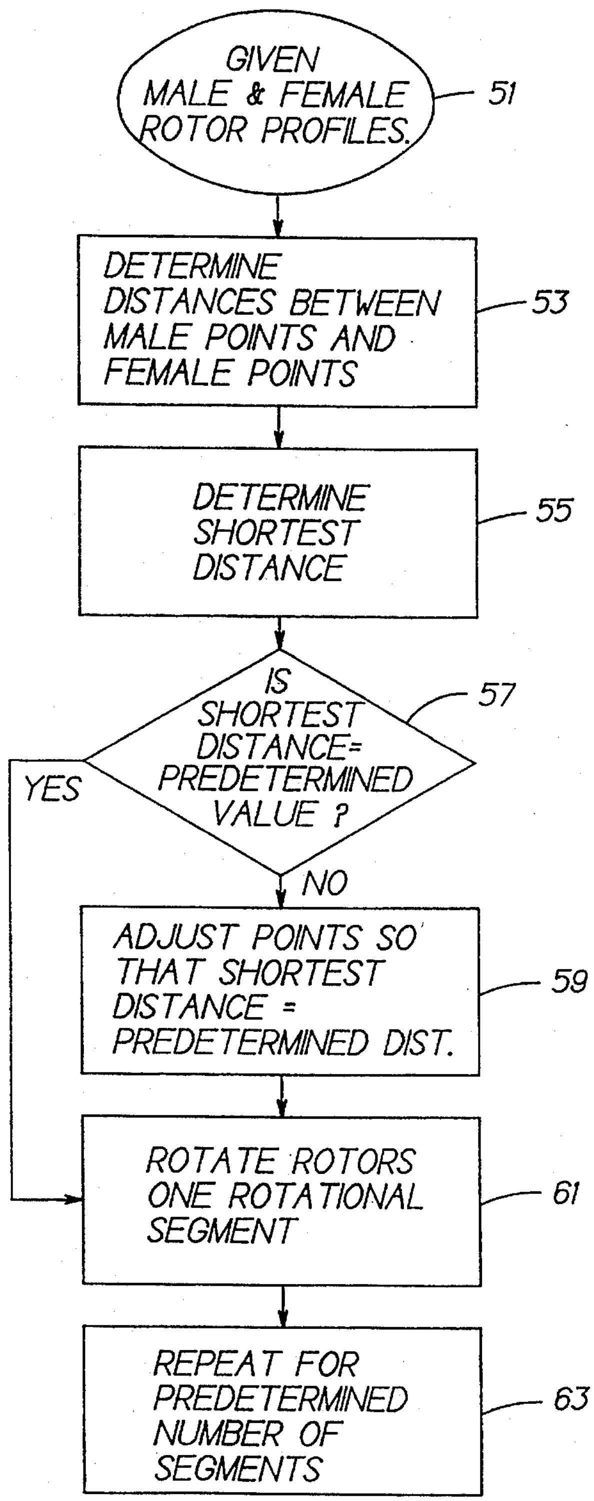
FIG. 9
GIVEN MALE & FEMALE ROTOR PROFILES.
51
DETERMINE DISTANCES BETWEEN MALE POINTS AND FEMALE POINTS
53
DETERMINE SHORTEST DISTANCE
55
IS SHORTEST DISTANCE= PREDETERMINED VALUE ?
57
YES
NO
ADJUST POINTS SO THAT SHORTEST DISTANCE = PREDETERMINED DIST.
59
ROTATE ROTORS ONE ROTATIONAL SEGMENT
61
REPEAT FOR PREDETERMINED NUMBER OF SEGMENTS
63

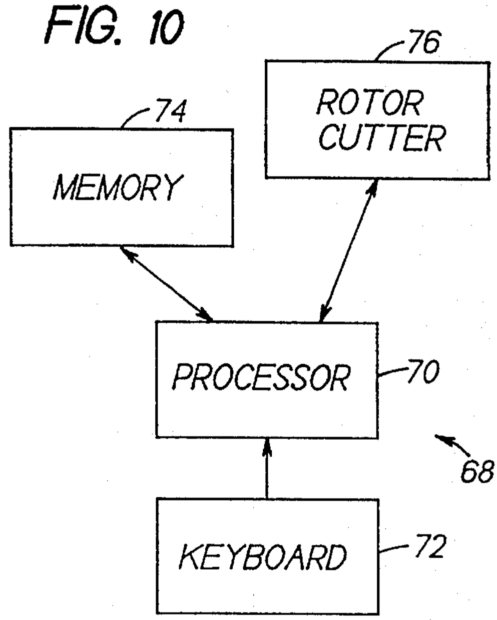
FIG. 10
76
ROTOR CUTTER
74
MEMORY
PROCESSOR
70
68
KEYBOARD
72

Y
X
5
5
PA
$l_P$
$l_T$
$P_2$
$P_1$
CD
31
30
34
20
40
14

METHOD AND APPARATUS FOR GENERATING PROFILES OF COOPERATING SCREW ROTORS

TECHNICAL FIELD

The present invention relates generally to helical screw rotors used in the compression and expansion of working fluids, and more particularly to improved profiles for screw rotors to provide reduced fluid leakage between cooperating rotors.

BACKGROUND OF THE INVENTION

Rotors of the type to which the present invention is directed, and machines using such rotors, are well-known and generally include cooperating pairs of rotors to perform work on a fluid. i.e., gas or liquid. A typical rotor pair includes a male rotor and a female rotor. Each rotor has several axially-extending lands that extend along the length of the rotor, and a corresponding number of grooves located between the lands. The radially outermost portion of each land defines the tip of a rotor lobe. The lobes of one rotor engage the grooves of the other rotor, such that the rotors rotate about their respective axes and in directions opposite to one another.

Each rotor includes a profile, which is the shape of the rotor viewed in a plane perpendicular to the axis of the rotor, e.g., a cross-section. The male rotor profile is generally characterized by convex surfaces, while the female rotor profile is generally characterized by concave surfaces. The male lobe profile includes a leading or driving flank, which drives a trailing or driven surface of the female rotor. The male driving and female driven flanks comprise the driving surfaces of a rotor pair.

The efficiency of cooperating screw rotors, and screw rotor machines, depends to a substantial extent upon how well the rotors mesh with one another during operation, i.e., how closely the corresponding rotor surfaces interact as the rotors rotate to one another. For example, as cooperating rotors rotate in opposite directions relative to one another, a tip of one rotor passes through a groove of the other rotor. On one head, if a tip of one rotor does not come into close proximity with the corresponding groove of the other rotor, the fluid disposed between the rotors escapes through the gap between the tip and the groove. One area at which the gap must be minimized is where the male tip and female tip rotate past one another, commonly referred to as a "blow hole". On the other hand, if the tip of one rotor extends too far, the rotors interfere with one another, and cannot rotate.

Those skilled in the art will recognize that more efficient screw rotors are typically defined by grooves that are asymmetric about a line drawn from the center of the rotor through the bottom of a groove. Known asymmetric screw rotors include male and female rotors having profiles that are defined by segments consisting of lines, arcs of circles, ellipses, trochoids, parabolas, involutes, hyperbolas and other fixed geometric shapes. However, rotors of the type characterized by fixed geometric shapes, and machines using these rotors are generally characterized by a limited efficiency and/or mechanical reliability. Moreover, such rotors and machines do not allow for the modification of a rotor profile to minimize clearances between rotors in order to provide increased efficiency and/or mechanical reliability.

SUMMARY OF THE INVENTION

The present invention resides in a method and related apparatus for producing male and female rotors with profiles having reduced fluid leakage between the cooperating rotors.

According to one aspect of the present invention, an apparatus for generating refined profiles for cooperating screw rotors includes a signal receiver for receiving signals indicative of a plurality of initial parameters for a first rotor and for a second rotor. The initial parameters include at least the outer diameters of the respective rotors, the number of lobes on the respective rotors, the distance between centers of the first and second rotors, and an offset which establishes the degree of asymmetry of the resultant lobe profiles of the first and second rotors. A first signal generator is of the apparatus generates signals indicative of an initial profile for one lobe of the first rotor defined by a first plurality of points positioned along the first rotor initial profile, and signals indicative of an initial profile for one lobe of the second rotor defined by a second plurality of points positioned along the second rotor initial profile. The signals indicative of the first and second rotor initial profiles are generated in accordance with the signals indicative of the initial parameters and the second rotor being adjacent to the first rotor. The apparatus also includes a measurer for measuring the distances between the first plurality of points and the second plurality of points, and generates signals indicative of the measured distances. A first comparitor of the apparatus compares the signals indicative of the measured distances for determining the signal indicative of the shortest distance of the measured distances and a second comparitor compares the signal indicative of the shortest distance with a signal indicative of a predetermined maximum distance. Further included is a profile refiner for refining the initial profile for the first rotor and the initial profile for the second rotor by repositioning at least one of the respective points defining the shortest distance toward the other of the respective points to define a new distance less than or equal to the predetermined maximum distance. A second signal generator generates signals indicative of a refined profile for the first rotor and a refined profile for the second rotor.

In another aspect of the present invention, a method of generating refined profiles for cooperating screw rotors includes the steps of receiving signals indicative of a plurality of parameters for a first rotor and a second rotor cooperating with the first rotor, including at least signals indicative of the outer diameters of the rotors, the numbers of lobes for the rotors, the distance between the centers of the first rotor and the second rotor, and an offset which establishes the degree of asymmetry of the resultant lobe profiles; generating signals indicative of an initial profile for one lobe of the first rotor and signals indicative of an initial profile for one lobe of the second rotor in response to the signals indicative of the plurality of parameters, the initial profile for the one lobe of the first rotor being defined by a first plurality of points positioned at known locations and the initial profile for the one lobe of the second rotor being defined by a second plurality of points positioned at known locations; measuring the distances between each of the first plurality of points and each of the second plurality of points, generating a signal indicative of each of the measured distances; comparing the signals indicative of the measured distances and determining the shortest distance of the measured distances; comparing the signal indicative of the shortest distance to a signal indicative of a predetermined maximum value; refining the initial profile for the first rotor and the initial profile for the second rotor by repositioning one of the respective points defining the shortest distance toward the other point to define a new distance less than or equal to the predetermined maximum value, if it is determined during the step of comparing the shortest distance that the shortest distance exceeds the predetermined maximum value; and generating signals indicative of the refined profile for the first rotor and the refined profile for the second rotor.

In yet another aspect of the present invention, a cooperating pair of first and second rotors made by a method in accordance with the present invention comprises the steps of receiving signals indicative of a plurality of parameters for a first rotor and a second rotor cooperating with the first rotor, including at least signals indicative of the outer diameters of the rotors, the numbers of lobes for the rotors, the helix angles of the rotors, i.e., a function of the helix angle and the axial length of the rotor, the distance between the centers of the first rotor and the second rotor, and an offset which establishes the degree of asymmetry of the resultant lobe profiles; generating signals indicative of an initial profile for one lobe of the first rotor and signals indicative of an initial profile for one lobe of the second rotor in response to the signals indicative of the plurality of parameters, the initial profile for the one lobe of the first rotor being defined by a first plurality of points positioned at known locations and the initial profile for the one lobe of the second rotor being defined by a second plurality of points positioned at known locations; measuring the distances between each of the first plurality of points and each of the second plurality of points, generating a signal indicative of each of the measured distances; comparing the signals indicative of the measured distances and determining the shortest distance of the measured distances; comparing the signal indicative of the shortest distance to a signal indicative of a predetermined maximum value; refining the initial profile for the first rotor and the initial profile for the second rotor by repositioning one of the respective points defining the shortest distance toward the other point to define a new distance less than or equal to the predetermined maximum value, if it is determined during the step of comparing the shortest distance that the shortest distance exceeds the predetermined maximum value; generating signals indicative of the refined profile for the first rotor and the refined profile for the second rotor; and producing the first and second rotors in accordance with the signals indicative of the refined profiles and the signals indicative of the helix angles of the first and second rotors.

It is accordingly a general object of the present invention to overcome the disadvantages and drawbacks of prior art screw rotors and methods and apparatus for producing such rotors.

It is a more specific object of the present invention to provide a screw rotors having profiles unencumbered by discrete geometric form, and which result in reduced leakage and smoother running drive surfaces.

It is another object of the present invention to provide a method of generating profiles for cooperating screw rotors with improved efficiency and with at least the same mechanical reliability as known screw rotors.

Figure 2:
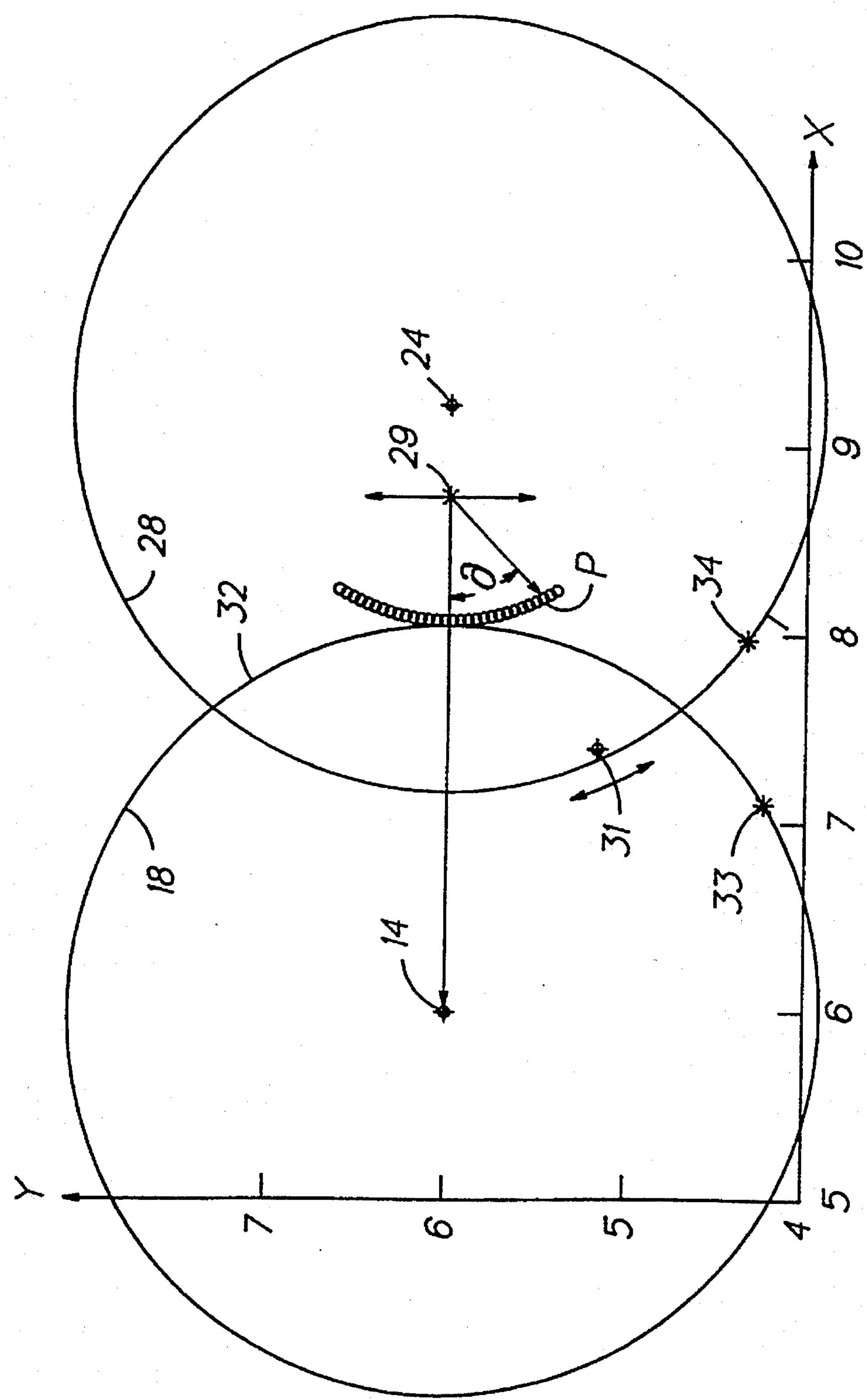
FIG. 2 is a view similar to FIG. 1, and shows the initial profiles of a male rotor lobe and a female rotor lobe in accordance with the present invention.

FIG. **2*a* is a view similar to FIG. 2**, and illustrates a female lobe profile after the first of four steps of roughing out the female lobe profile.

Figure 1:
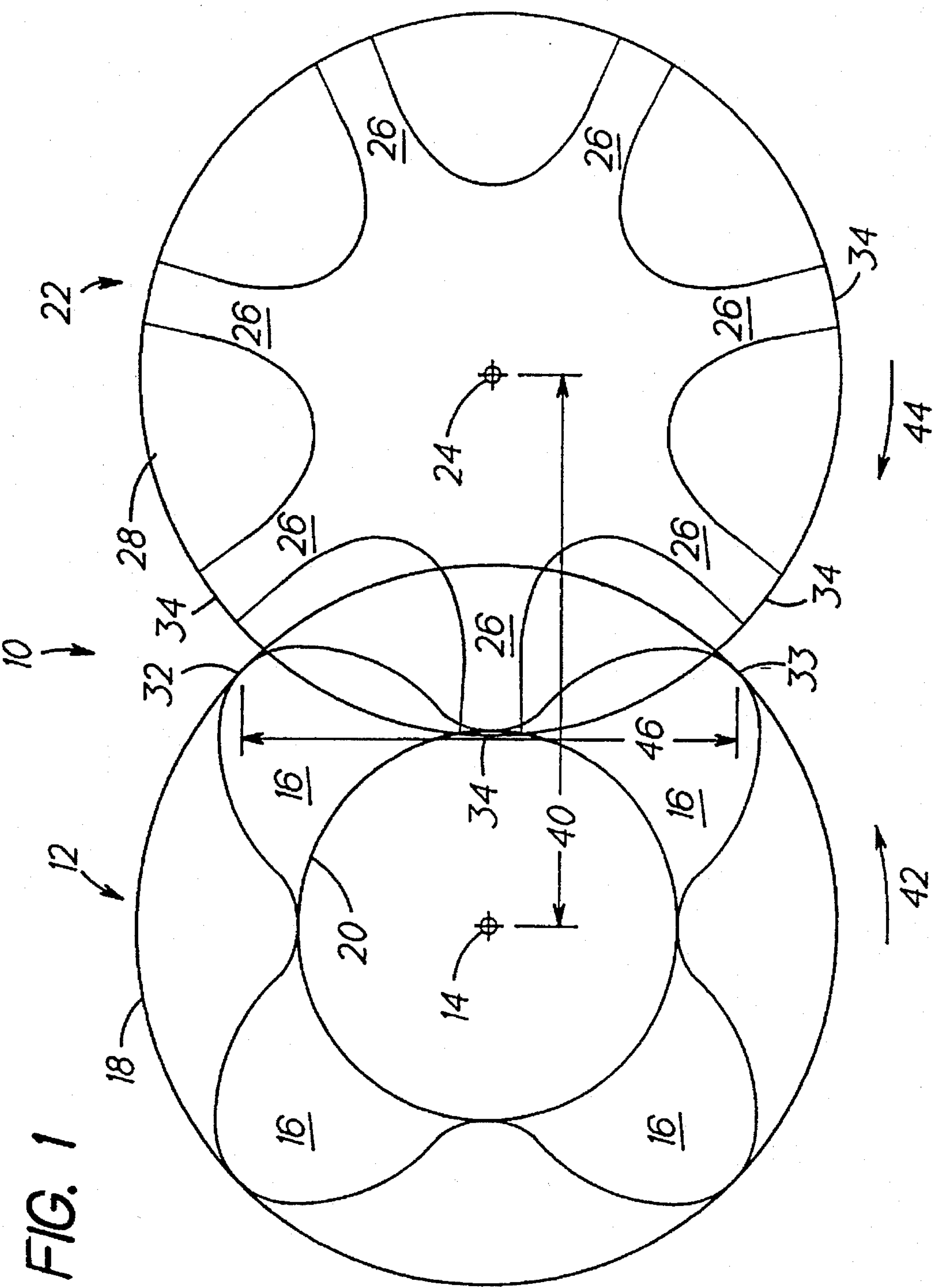
FIG. 1 is a view of computer-generated profiles for a pair of male and a female helical screw rotors refined in accordance with the present invention.
Figure 3:
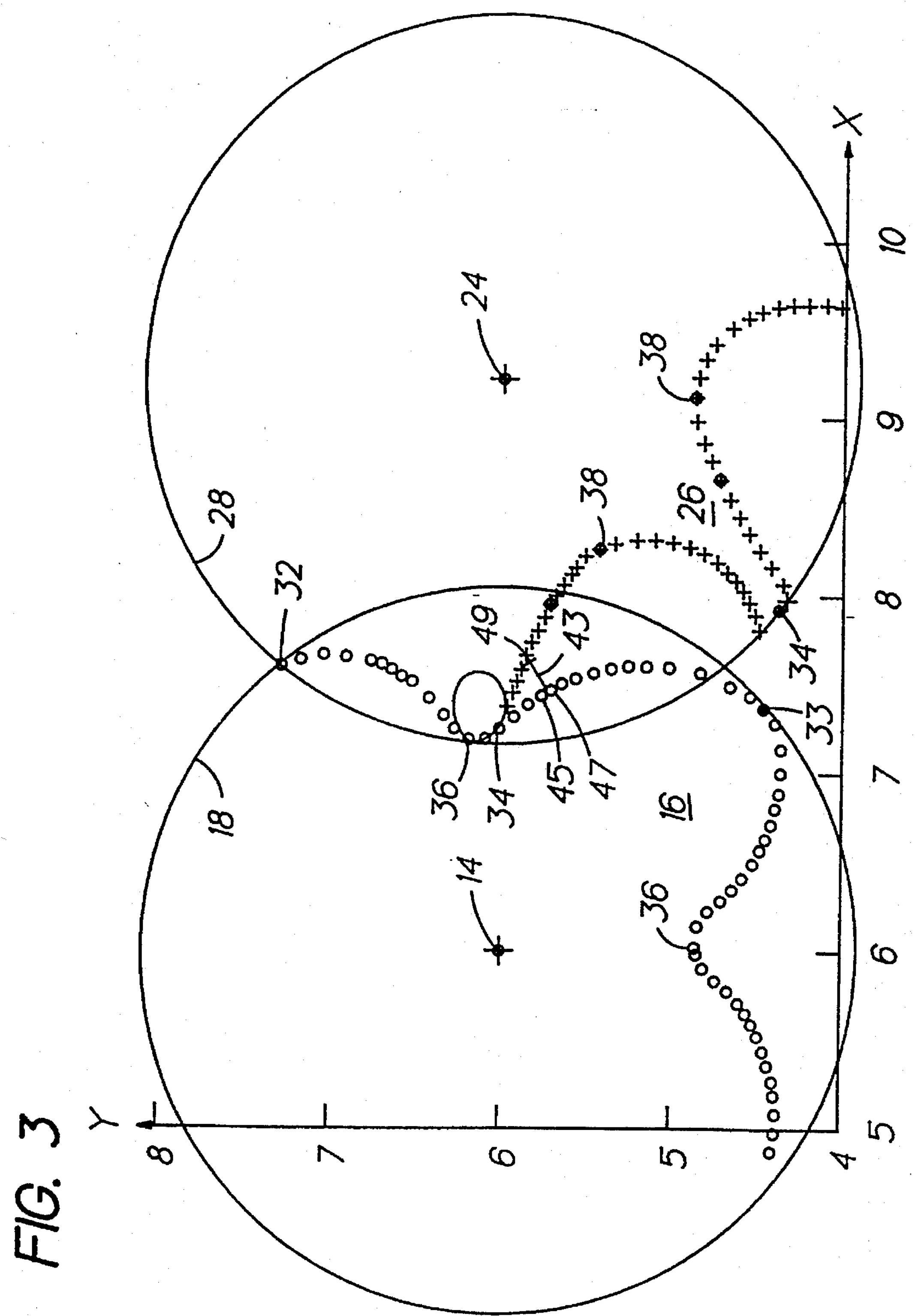

FIG. 3 is a view of a computer-generated roughed out male and female rotor lobe profiles used to produce the refined male and female rotor profiles shown in FIG. 1.

Figure 4:
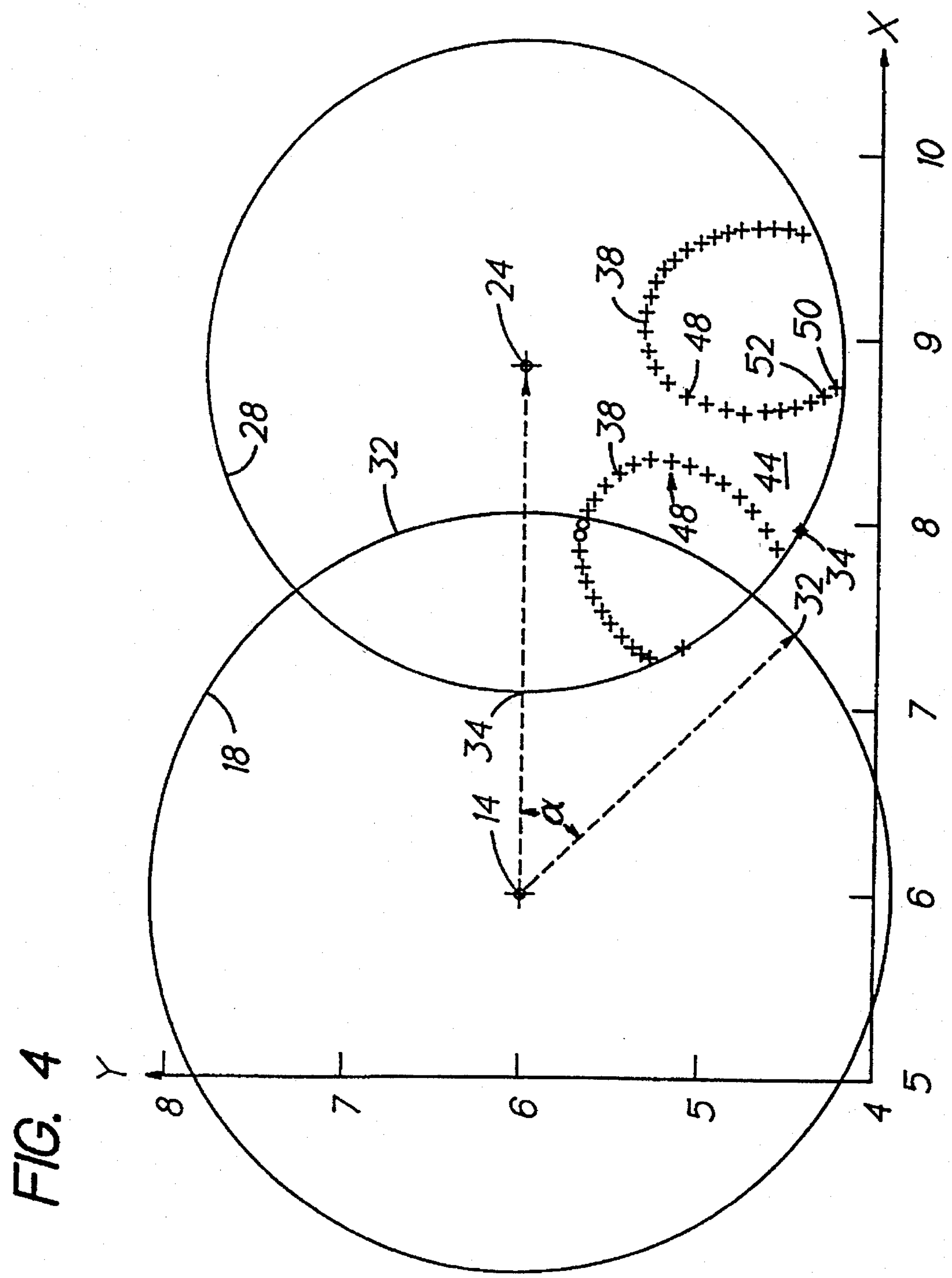

FIG. 4 is a view of a computer-generated refined female rotor lobe profile that has been refined one time in accordance with the present invention using the male tip to refine the initial female profile of FIG. 3.

Figure 5:
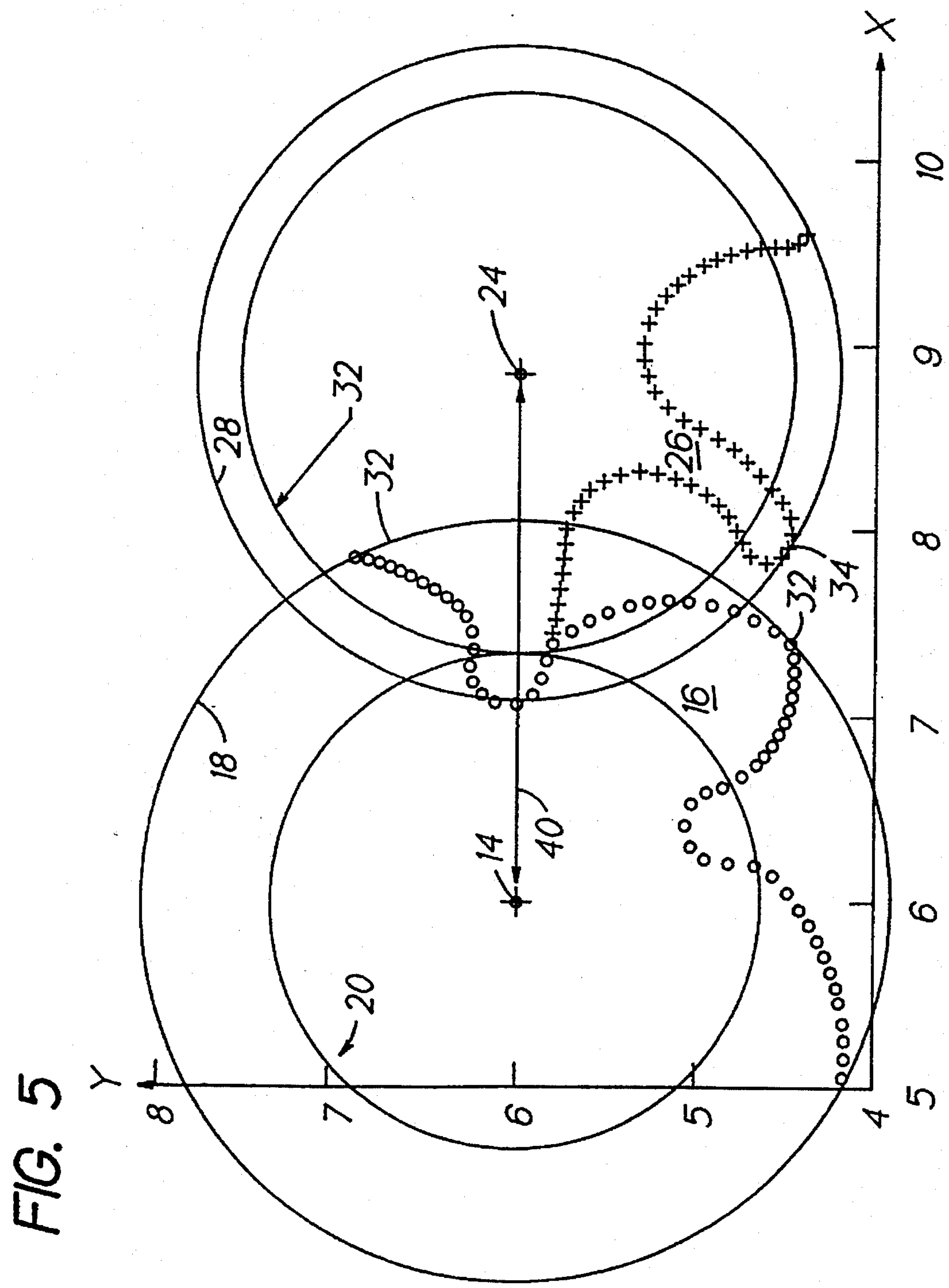

FIG. 5 is a view similar to FIG. 1, and illustrates partially-generated rotor lobe profiles, as well as the outer and pitch diameters of each of the rotors.

Figure 6:
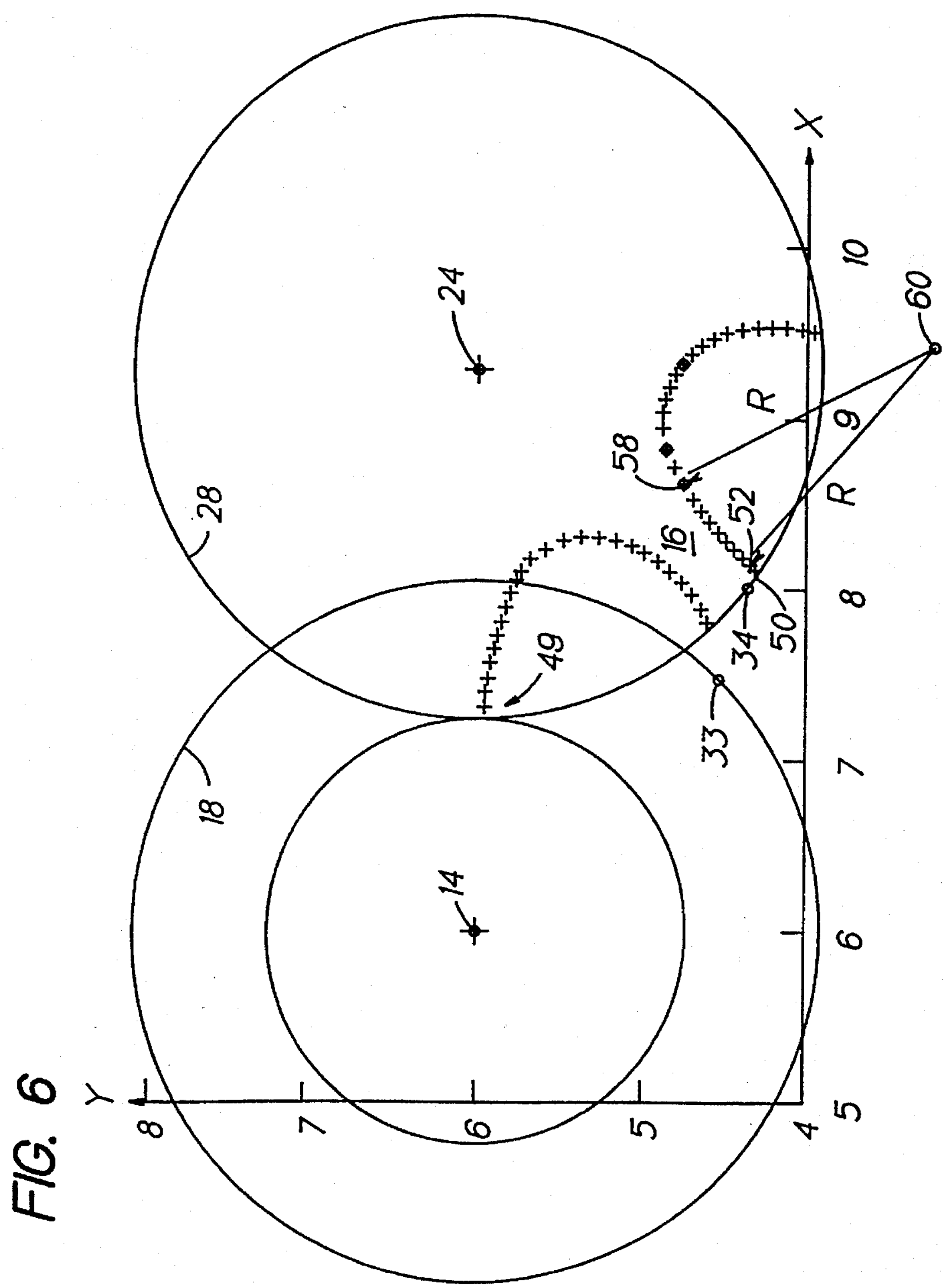

FIG. 6 is a view of a computer-generated female rotor lobe profile, with the trailing, driven flank roughed out in accordance with the present invention.

Figure 7:
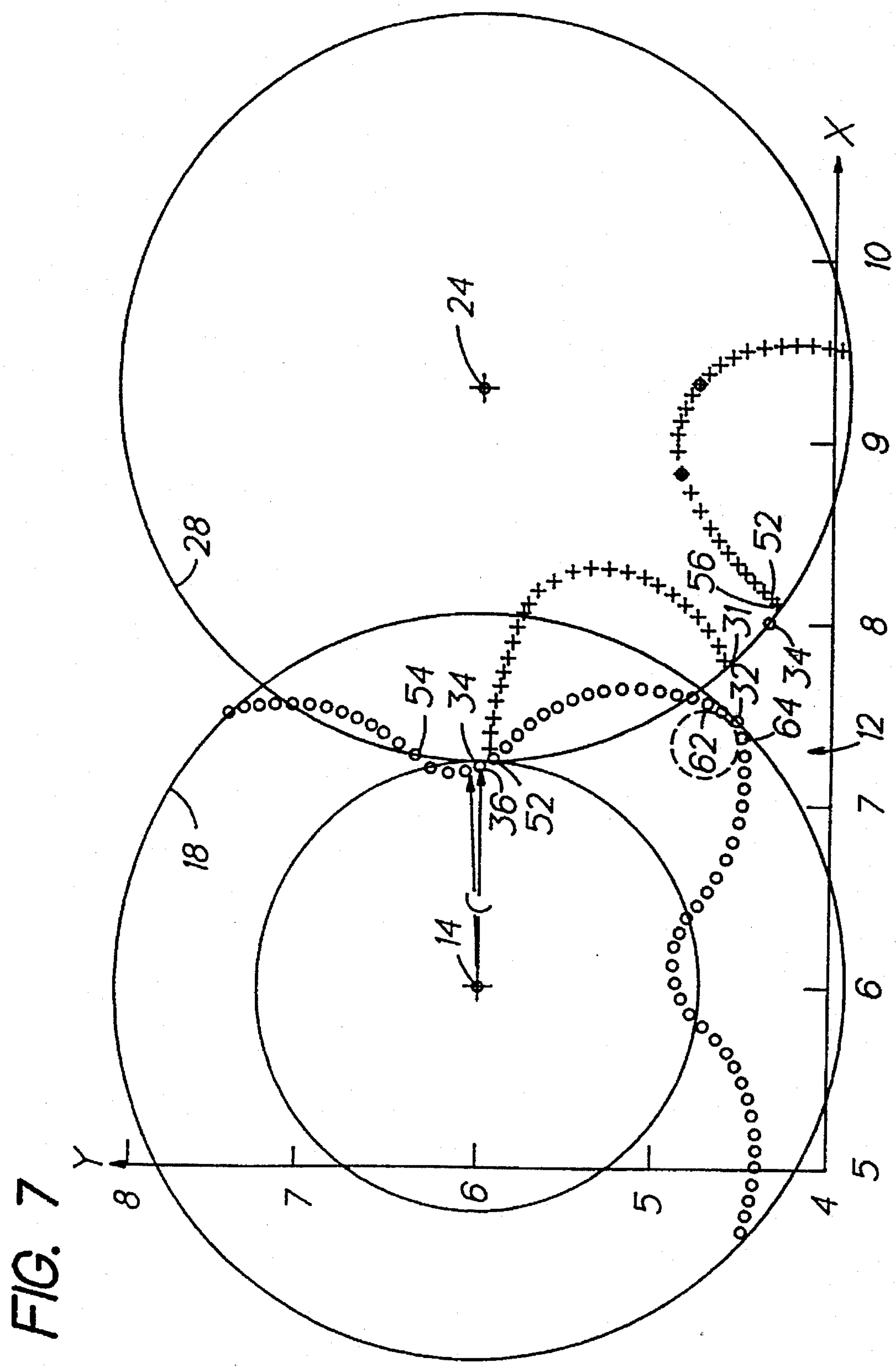

FIG. 7 is a view of the rotors similar to the view shown in FIG. 5, and illustrates a roughed out profile for a male rotor lobe.

Figure 8:
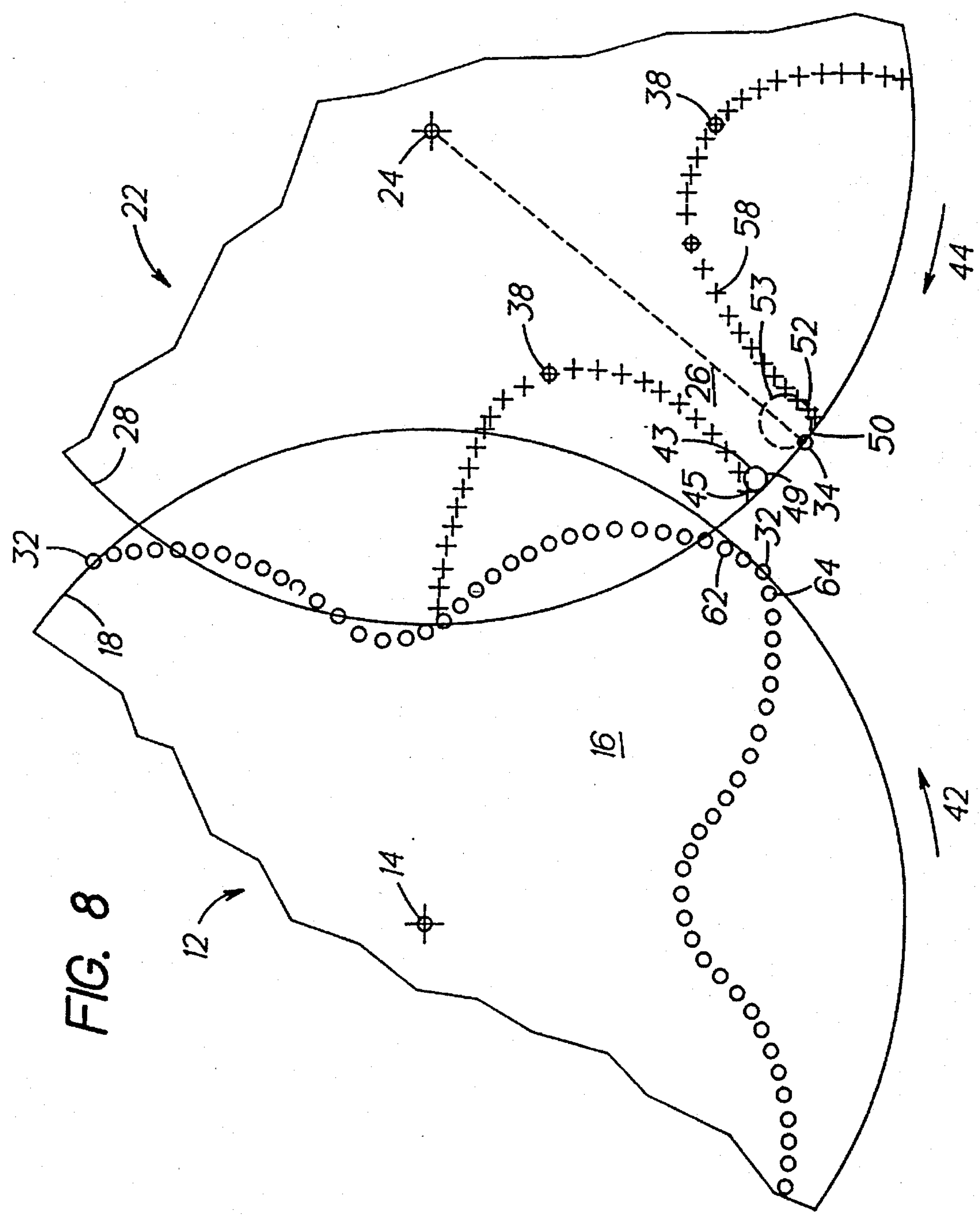

FIG. 8 is an enlarged and partial fragmentary view of the rotors shown in FIG. 7, but also shows the trailing tip portion of the female profile roughed out in accordance with the present invention.

FIG. 9 is a flow diagram illustrating the steps of a refinement of the rotor profiles.

FIG. 10 is a schematic view of an apparatus embodying the present invention for generating profiles for cooperating screw rotors.

Figure 11:
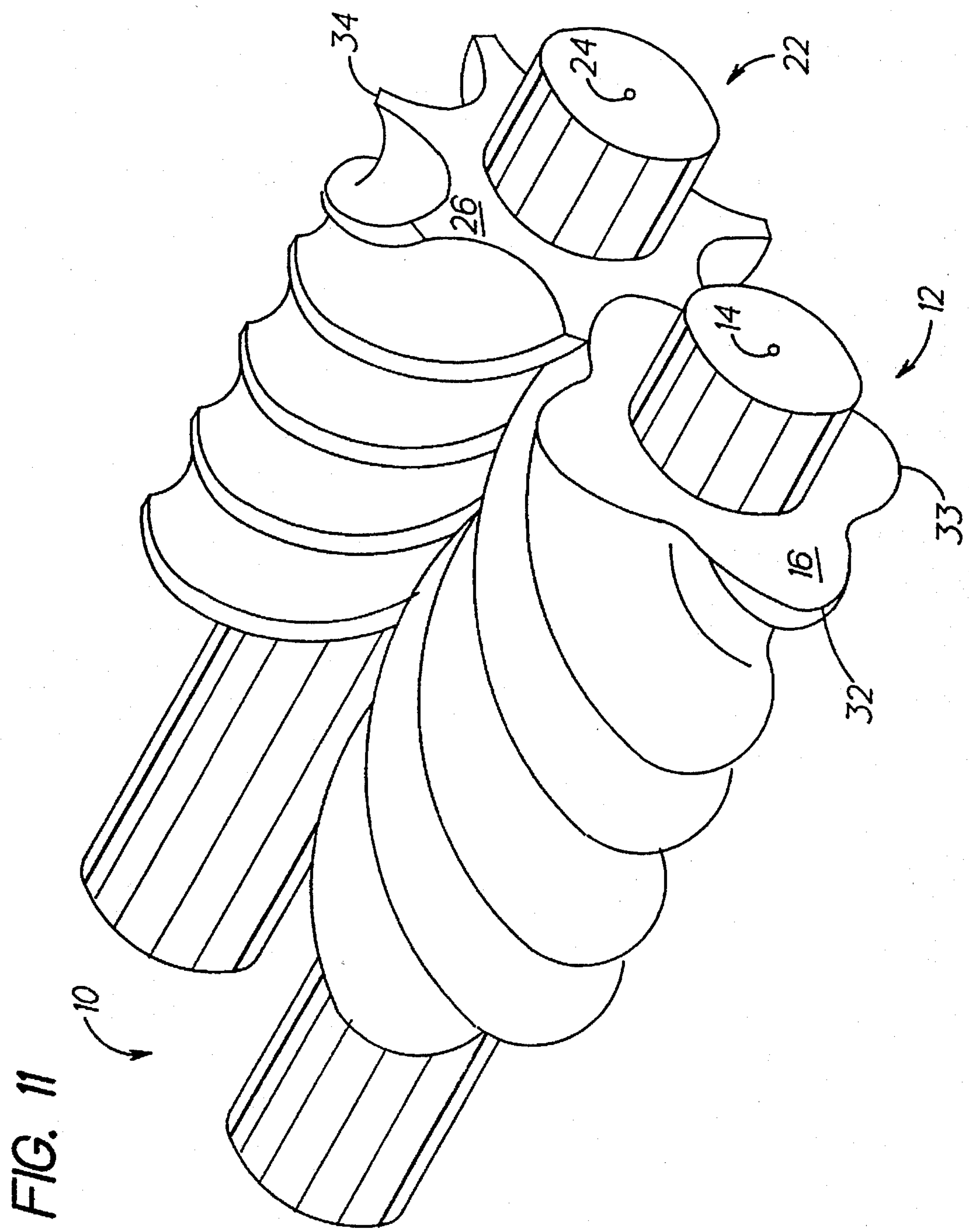

FIG. 11 is a perspective view of a pair of rotors made in accordance with the present invention.

Figure 12:
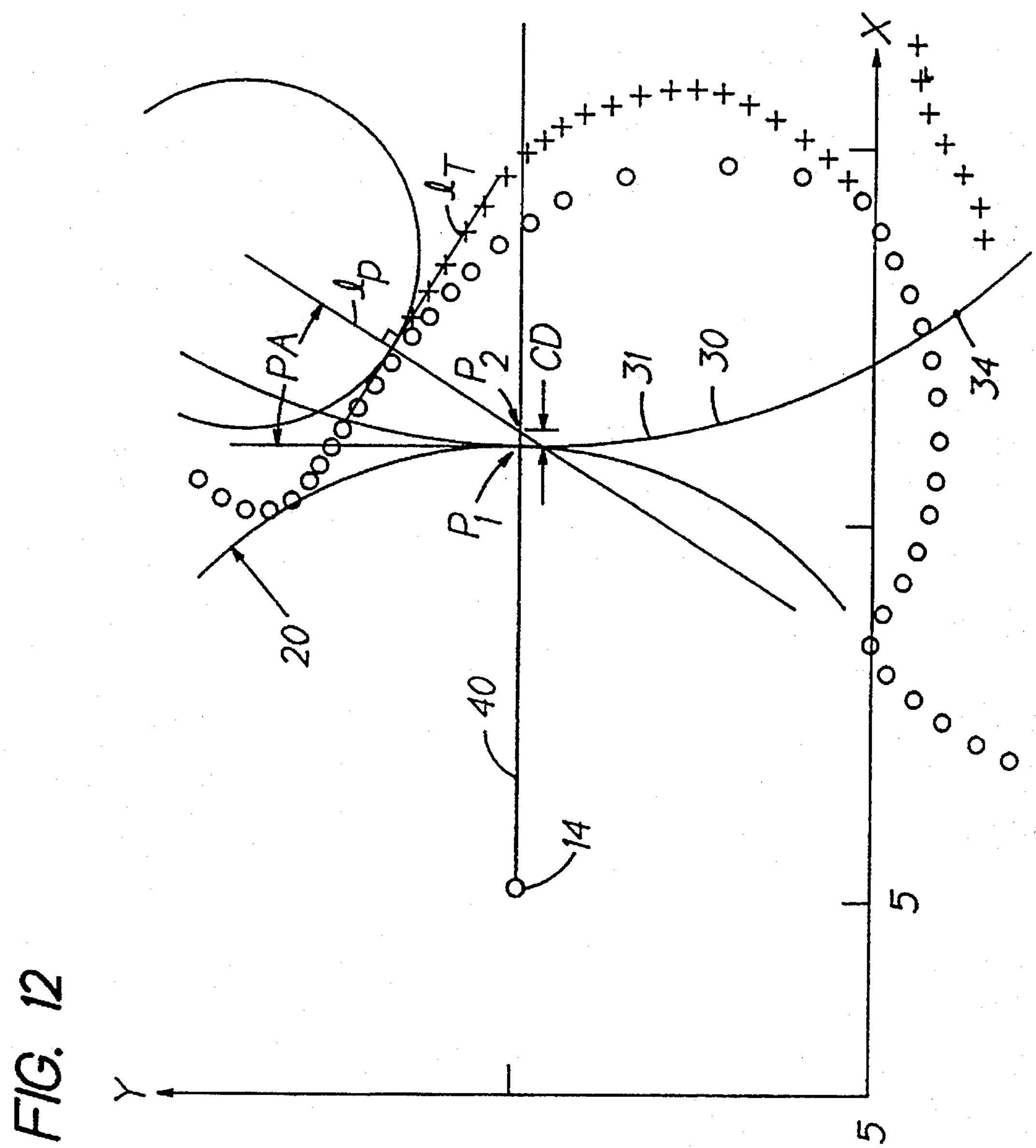

FIG. 12 is a partial and enlarged view of the refined computer-generated rotor profiles illustrating a conjugacy deviation of the profiles, which is a distance between the intersection of the rotor pitch diameters and the intersection of a line connecting the rotor centers and a line perpendicular to the driving surfaces of the rotors.

DETAILED DESCRIPTION OF THE PREFERRED EMBODIMENTS

In FIG. 1, refined profiles for a cooperating pair of screw rotors made in accordance with the present invention are indicated generally by reference numeral 10. The rotor pair 10 includes a male rotor 12, which is generally characterized by a center 14, a number of identically-shaped lobes 16, an outer diameter 18 and a pitch diameter 20 (shown in FIG. 5), and a female rotor 22, which is also generally characterized by a center 24, a number of identically-shaped lobes 26, an outer diameter 28 and a pitch diameter 30 (shown in FIG. 5). The identically shaped lobes 16 and 26 are spaced equidistantly around the periphery of the respective rotors, and as shown typically in FIG. 3, each of the lobes 16 and 26 defines a tip 32 and 34, respectively, and two troughs 36 and 38, or roots, with one trough located on each side of a lobe. As shown in FIG. 1, the rotor centers 14, 24 are separated by a distance 40, and the rotors 12, 22 rotate in opposite directions, as shown by the arrows 42, 44 when the rotors are used in a compressor. The rotors extend in an axial direction (not shown), with axially-extending lands generally defining the tips of the lobes and axially-extending grooves located between the lands and defining the groove portion of the lobes.

The rotors are used, for example, in an apparatus for performing work on, e.g., compressing, fluids such as air, hydrogen, butane or refrigerants, for example R-22. Such an apparatus generally includes a housing defining an inlet, a cavity within which a pair of rotors is received, and an outlet. The apparatus may also include a set of coils coupled between the outlet and the inlet, for example, for effecting heat transfer to or from the apparatus. The apparatus housing substantially bounds and is co-extensive with the rotor outer diameters, so that fluid does not leak between a rotor and the housing. In operation of the apparatus, a fluid enters the apparatus through the inlet, and is captured between the rotors as the rotors are rotated in opposite directions relative to one another to perform work on the fluid, e.g., compression, as desired. The worked-upon fluid then exits the housing through the outlet for use in, for example heating or cooling coils of a heat pump. As will be recognized by those skilled in the art, the method and apparatus described herein are equally applicable for rotors used in an expander or like apparatus, or in an apparatus in which the female rotor drives the male rotor.

The rotor profiles are initially generated and "roughed out", i.e., roughly refined, using the initial parameters, and subsequently refined. The female rotor 22 is roughed out in four steps, as described below, while the male rotor 12 is roughed out in a single step. As noted above, each rotor is initially defined by several parameters, which may vary depending upon the application for which the rotors are being generated, and in the embodiment of the present invention illustrated, the rotors are to be used in a compressor. The male rotor 12 drives the female rotor 22, and has 4 lobes defining an outer diameter 18 of 4.2 inches. The female rotor has 7 lobes defining an outer diameter 28 of 4.2 inches. The center spacing distance 40 between the rotors is 3.3 inches. As shown typically in FIG. 2, in terms of X-Y coordinates, the center 14 of the male rotor 12 is positioned at a known location, for example X=6, Y=6, and the female center 24 is also positioned at a known location, for example X=9.3, Y=6.

As shown in FIG. 1, the rotors 12, 22 are also characterized by an offset parameter 46, which is used to establish the extent of asymmetry of the rotor profiles, and is also used to indicate an initial relative orientation of the tips 32, 34 from which the rotor profiles are generated. As shown in FIG. 1, the offset parameter 46 indicates the location of a female lobe tip 34 relative to two adjacent male lobe tips 32, 33, and by way of example, an offset of 0.5 indicates that a female tip is initially positioned equidistant between the two, adjacent male tips. More specifically, and with reference to FIG. 4, one of the female tips 34 is initially oriented in a known position, for example, on a line that connects the rotor centers 14, 24. The initial angle defined by the male tip 33 immediately below the centerline, the male center 14 and the centerline is defined by the following relationship:

initial angle (in radians)=2 * $\pi$ * offset/number of male lobes. The initial angle is measured downwardly from the line connecting the rotor centers 14,24. The offset is preferably between about 0.30 and 0.40. As the offset decreases from 0.5, the thickness of a tip of a resulting female lobe decreases.

As is discussed further below and shown typically in FIG. 2, the rotor profiles are defined by a number of points, which are in turn defined in local polar coordinates, including a length l from the respective polar origin, and an angle $\partial$. A male polar origin 29 and a female polar origin 31 are each located radially outwardly from the respective rotor profile. The angle $\partial$ for a point, for example point P of FIG. 2, is the angle between a first line from the polar origin to the point, and a second line from the polar origin to the center of the respective rotor. Thus, the male angle for a particular male point is the angle between a line from the male polar origin 29 to the particular male point and a line from the male polar origin to the male center. The male polar origin 29 rotates with the male rotor 12 about the male center 14. The female polar origin 31 is also defined using the corresponding female aspects, preferably as shown in FIG. 5 is located on the female outer diameter 28, and rotates with the female rotor 22. The points are equally defined in Cartesian, or X-Y coordinates. Those skilled in the art will recognize that machines for cutting rotors typically utilize a similar manner of defining a profile for a tool to cut a rotor from, for example, a metal rotor blank.

An initial profile, shown in FIG. 2, is generated for each of the rotors using the initial parameters, i.e. the outer diameters 18,28, the number of lobes, the center-to center spacing 40 of the rotors, and the offset parameter 46. The initial profiles are generated primarily to establish, in polar coordinates, the angle for each of the male and the female points, which (with a few exceptions described below) remain the same throughout the profile-generating process described below. During the initial profile generation, each rotor is rotated a sufficient amount to encompass one pitch, i.e., an angle that encloses a complete lobe 16 or 26. The length l for each initial point is not critical, and as shown in Table 1 is set at 0.612 inches for the male rotor and 0.0612 for the female rotor. The positions of the tips 32,33 and 34 are fixed around and adjacent to their respective outer diameters 18,28. While the tips do rotate with a respective rotor, i.e. about a center 14,24 their positions (length and angle) relative to a respective polar origin are not altered. The initial polar and Cartesian coordinates for the points are shown in Tables 1 and 2 below, respectively.

TABLE 1

| | Polar Coordinates of Initial Profiles | | | |
|---|---|---|---|---|
| Point | Male Angle | Male Length | Female Angle | Female Length |
| 0 | 49.4301 | 1.4445 | 77.1429 | 0.9346 |
| 1 | 46.8757 | 0.6120 | 77.6430 | 0.0612 |
| 2 | 44.3212 | 0.6120 | 76.8572 | 0.0612 |
| 3 | 41.7668 | 0.6120 | 72.5715 | 0.0612 |
| 4 | 39.2123 | 0.6120 | 66.2858 | 0.0612 |
| 5 | 36.6579 | 0.6120 | 60.0001 | 0.0612 |
| 6 | 34.1034 | 0.6120 | 55.7143 | 0.0612 |
| 7 | 31.5490 | 0.6120 | 51.4286 | 0.0612 |
| 8 | 28.9945 | 0.6120 | 47.1429 | 0.0612 |
| 9 | 26.4400 | 0.6120 | 42.8572 | 0.0612 |
| 10 | 23.8856 | 0.6120 | 38.5714 | 0.0612 |
| 11 | 20.3311 | 0.6120 | 34.2858 | 0.0612 |
| 12 | 15.7767 | 0.6120 | 30.0000 | 0.0612 |
| 13 | 11.2222 | 0.6120 | 25.7143 | 0.0612 |
| 14 | 8.6678 | 0.6120 | 21.4286 | 0.0612 |
| 15 | 6.1134 | 0.6120 | 17.1429 | 0.0612 |
| 16 | 4.0588 | 0.6120 | 12.8571 | 0.0612 |
| 17 | 2.7272 | 0.6120 | 8.5715 | 0.0612 |
| 18 | 2.2618 | 0.6120 | 4.2857 | 0.0612 |
| 19 | 0.8955 | 0.6120 | 0.0000 | 0.0612 |
| 20 | −1.6589 | 0.6120 | −4.2857 | 0.0612 |
| 21 | −4.2134 | 0.6120 | −8.5715 | 0.0612 |
| 22 | −6.7678 | 0.6120 | −12.8571 | 0.0612 |
| 23 | −9.3223 | 0.6120 | −17.1429 | 0.0612 |
| 24 | −11.8768 | 0.6120 | −21.4286 | 0.0612 |
| 25 | −14.4312 | 0.6120 | −25.7143 | 0.0612 |
| 26 | −16.9857 | 0.6120 | −30.0000 | 0.0612 |
| 27 | −19.5401 | 0.6120 | −34.2858 | 0.0612 |
| 28 | −22.0946 | 0.6120 | −38.5714 | 0.0612 |
| 29 | −24.6491 | 0.6120 | −42.8572 | 0.0612 |
| 30 | −27.2035 | 0.6120 | −47.1429 | 0.0612 |
| 31 | −29.7580 | 0.6120 | −51.4286 | 0.0612 |
| 32 | −32.3124 | 0.6120 | −55.7143 | 0.0612 |
| 33 | −36.8669 | 0.6120 | −60.0001 | 0.0612 |
| 34 | −39.4214 | 0.6120 | −64.2857 | 0.0612 |
| 35 | −41.9758 | 0.6120 | −70.5715 | 0.0612 |
| 36 | −44.5303 | 0.6120 | −74.8572 | 0.0612 |
| 37 | −49.1846 | 0.6120 | −76.5858 | 0.0612 |
| 38 | −47.9119 | 0.6120 | −77.4400 | 0.0612 |
| 39 | −47.6391 | 2.4232 | −77.1429 | 0.9236 |

TABLE 2

| | X-Y Coordinates of Initial Profiles | | | |
|---|---|---|---|---|
| Point | Male X | Male Y | Female X | Female Y |
| 0 | 7.0972 | 4.2095 | 7.9907 | 4.3582 |
| 1 | 6.4467 | 3.6884 | 8.7773 | 3.9787 |
| 2 | 6.4276 | 3.7078 | 8.7777 | 3.9795 |
| 3 | 6.4077 | 3.7265 | 8.7799 | 3.9835 |
| 4 | 6.3869 | 3.7442 | 8.7836 | 3.9891 |
| 5 | 6.3654 | 3.7610 | 8.7878 | 3.9943 |
| 6 | 6.3431 | 3.7768 | 8.7911 | 3.9975 |
| 7 | 6.3202 | 3.7915 | 8.7945 | 4.0005 |
| 8 | 6.2967 | 3.8053 | 8.7982 | 4.0032 |
| 9 | 6.2725 | 3.8180 | 8.8021 | 4.0057 |
| 10 | 6.2478 | 3.8296 | 8.8062 | 4.0078 |
| 11 | 6.2126 | 3.8439 | 8.8103 | 4.0096 |
| 12 | 6.1664 | 3.8589 | 8.8147 | 4.0111 |
| 13 | 6.1191 | 3.8703 | 8.8191 | 4.0123 |
| 14 | 6.0922 | 3.8750 | 8.8236 | 4.0132 |
| 15 | 6.0652 | 3.8785 | 8.8281 | 4.0137 |
| 16 | 6.0433 | 3.8805 | 8.8327 | 4.0139 |
| 17 | 6.0291 | 3.8813 | 8.8373 | 4.0137 |
| 18 | 6.0242 | 3.8815 | 8.8418 | 4.0132 |
| 19 | 6.0096 | 3.8819 | 8.8463 | 4.0123 |
| 20 | 5.9823 | 3.8817 | 8.8507 | 4.0111 |
| 21 | 5.9550 | 3.8803 | 8.8551 | 4.0096 |
| 22 | 5.9279 | 3.8777 | 8.8593 | 4.0078 |
| 23 | 5.9009 | 3.8739 | 8.8633 | 4.0057 |
| 24 | 5.8740 | 3.8689 | 8.8672 | 4.0032 |
| 25 | 5.8475 | 3.8627 | 8.8709 | 4.0005 |
| 26 | 5.8212 | 3.8553 | 8.8743 | 3.9975 |
| 27 | 5.7953 | 3.8468 | 8.8776 | 3.9943 |
| 28 | 5.7698 | 3.8371 | 8.8806 | 3.9908 |
| 29 | 5.7448 | 3.8262 | 8.8833 | 3.9871 |
| 30 | 5.7202 | 3.8143 | 8.8857 | 3.9833 |
| 31 | 5.6962 | 3.8013 | 8.8878 | 3.9792 |
| 32 | 5.6729 | 3.7872 | 8.8897 | 3.9750 |
| 33 | 5.6328 | 3.7596 | 8.8912 | 3.9707 |
| 34 | 5.6114 | 3.7428 | 8.8924 | 3.9663 |
| 35 | 5.5907 | 3.7250 | 8.8935 | 3.9597 |
| 36 | 5.5708 | 3.7063 | 8.8939 | 3.9551 |
| 37 | 5.5368 | 3.6700 | 8.8939 | 3.9532 |
| 38 | 5.5458 | 3.6802 | 8.8939 | 3.9523 |
| 39 | 4.2095 | 4.9028 | 9.7673 | 3.9527 |

As is described further below, the initial female profile is roughed out in four steps, while the initial male profile is roughed out in a single step. During the first step of roughing out the female profile, the male tip is rotated (in segments) through the female rotor as the rotors rotate relative to one another, as would occur during use of the finished rotors, and a female point is repositioned to be located adjacent to the male tip. During the second step, the portion of the female tip near the female leading flank is rounded. The portion of the female tip near the trailing, driven flank is rounded. During the fourth step, the female trailing flank is modified. The male profile is roughed out by rotating the rotors relative to one another, and repositioning the male points so that they are adjacent to the female points.

In the first step of roughing out the female rotor, the initial profile of a female rotor lobe 26 is modified by rotating a male tip 32 through the female rotor 22 as the rotors rotate relative to one another. The rotation of each rotor is, in turn, divided into multiple segments as described further below, and the location of the male tip 32 is determined at each rotational segment, towards which a corresponding female point is repositioned. Each lobe profile is separated into 39 segments. Accordingly, each rotational segment is a predetermined rotation, i.e., a rotational amount equal (in radians) to $(2\times\pi)/(\text{number male lobes}\times\text{number segments})$.

The first step is performed using the male tip 32, and a user-defined clearance, for example 0.003 inch, between the male tip and each female point as the male tip is rotated in segments along the female profile, as described below. For the 39 points defining the profile of the female lobe 26, 40 segments are used, i.e., the 38 segments defined by the 39 points, and an additional segment at each end. With reference to FIG. 9, profiles are given for the male rotor and for the female rotor (block 51). At a given rotational position of the male and female rotors, the distance between a male point, in this case the male tip, and each female point is calculated (block 53) using known methods, and the shortest distance between the male tip and a female point is determined (block 55). The shortest distance is compared to a predetermined distance, i.e., the user-defined clearance of 0.003 inch (block 57). If the shortest distance is not equal than the user-defined clearance, the known location of the female point is repositioned by altering the polar length of the female point so that the shortest distance is equal to the user-defined clearance.

Figure 2A:
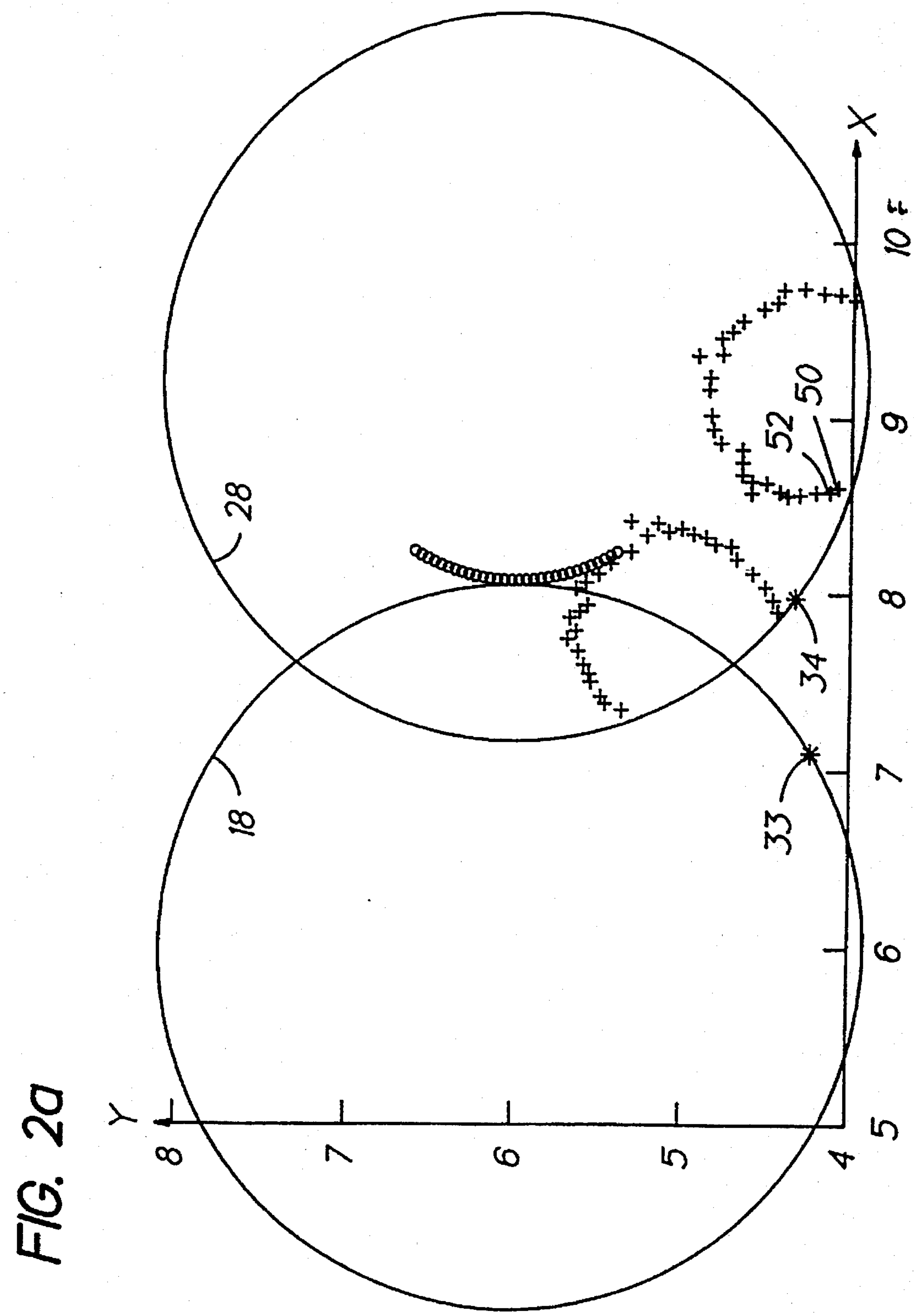

The resultant female points from this first step are shown in FIG. 2*a*, and define a "horseshoe" shaped female profile. The clearances between the male tip and the female points before and after this refinement are set forth in Tables 3 and 4, respectively.

TABLE 3

| Clearance Between Male Tip and Female Surface Points Before Refinement | | | | |
|---|---|---|---|---|
| Male Point | Female Point | Clearance | Female Point | Rotation |
| 0 | 10 | 0.00172 | Cav | 31 |
| 40 | 11 | −0.00053 | Cvx | 30 |
| 40 | 12 | 0.00779 | Cav | 29 |
| 40 | 13 | −0.00732 | Cvx | 28 |
| 40 | 14 | 0.02549 | Cav | 27 |
| 40 | 15 | −0.00714 | Cvx | 25 |
| 40 | 16 | 0.00399 | Cav | 24 |
| 40 | 18 | 0.05589 | Cav | 22 |
| 40 | 19 | −0.03624 | Cvx | 20 |
| 40 | 20 | −0.03795 | Cvx | 20 |
| 40 | 21 | 0.02615 | Cav | 18 |
| 40 | 22 | −0.00781 | Cvx | 16 |
| 40 | 23 | −0.00936 | Cvx | 16 |
| 40 | 24 | 0.01681 | Cav | 14 |
| 40 | 25 | 0.00310 | Cav | 13 |
| 40 | 26 | 0.00280 | Cav | 12 |
| 40 | 27 | −0.00473 | Cvx | 12 |
| 40 | 28 | 0.01104 | Cav | 10 |
| 40 | 29 | −0.00320 | Cvx | 9 |
| 40 | 30 | 0.00329 | Cav | 9 |
| 40 | 31 | −0.00542 | Cvx | 8 |
| 40 | 32 | 0.03270 | Cav | 7 |
| 40 | 34 | −0.00436 | Cvx | 6 |
| 40 | 36 | 0.00644 | Cav | 4 |
| 40 | 37 | −0.00892 | Cvx | 4 |

TABLE 4

| Clearance Between Male Tip and Female Surface Points After Refinement | | | | |
|---|---|---|---|---|
| Male Point | Female Point | Clearance | Female Point | Rotation |
| 40 | 10 | −0.00758 | Cvx | 31 |
| 40 | 12 | 0.00195 | Cav | 29 |
| 40 | 14 | 0.00315 | Cav | 27 |
| 40 | 15 | 0.00320 | Cav | 26 |
| 40 | 16 | 0.00219 | Cav | 24 |
| 40 | 17 | 0.00300 | Cav | 22 |
| 40 | 18 | 0.00300 | Cav | 21 |
| 40 | 19 | 0.00300 | Cav | 20 |
| 40 | 23 | 0.00300 | Cav | 16 |
| 40 | 25 | 0.01631 | Cav | 14 |
| 40 | 26 | 0.00313 | Cvx | 12 |
| 40 | 27 | 0.00301 | Cav | 11 |

TABLE 4-continued

| Clearance Between Male Tip and Female Surface Points After Refinement | | | | |
|---|---|---|---|---|
| Male Point | Female Point | Clearance | Female Point | Rotation |
| 40 | 28 | 0.00300 | Cav | 10 |
| 40 | 35 | 0.00300 | Cav | 5 |
| 40 | 36 | 0.00321 | Cvx | 5 |
| 40 | 37 | 0.00375 | Cvx | 4 |

As shown in FIG. 8, the profile of the initial female lobe 26 is modified during a second step to minimize or eliminate a "blow hole" leak and provide improved wear characteristics for the rotors. The area at which such a leak occurs is indicated at 49 in FIG. 6, where a portion of the female rotor on the leading flank and adjacent to the female tip rotates into proximity with a male tip 32 or 34. In order to minimize the blow hole and as shown in FIG. 8, a portion of the profile of the female lobe adjacent to the female tip 34 is adjusted by repositioning points 43, 45 toward the female tip 34. The female points, 43, 45 are repositioned to define an arc 49 (or circle) of a small pre-selected radius, e.g., 0.04 inch, while maintaining a small clearance between the tip and the housing (not shown) adjacent to the female outer diameter 28, and the arc (or circle) is positioned so that it is tangent to the outer diameter 28.

The twice-modified female profile is modified during a third step also in order to provide rotors having lobes with good wear characteristics. The third step in roughing out the female profile is then made to the twice-modified female lobe 26, in which a portion of the female tip 34 adjacent to the trailing, or driven, flank of the female lobe is modified, and during which the trailing flank tip portion is rounded. As also shown in FIG. 8, the points 34, 56, 52 near the female tip 34 are first adjusted to define an arc of a circle 52 having a diameter which is small compared to the female rotor outer diameter 28 but which is co-linear with a radius (shown by a dashed line in FIG. 8) from the female center 24 to the female tip 34.

After moving the points 56, 52 as necessary, and as shown in FIG. 6, the fourth step of roughing out the female profile is performed. Using another point along the trailing portion of the female lobe and between the tip 34 and trough 38 of the female lobe 26 is selected, for example point 58, as is a point 60 that separated from the trailing flank, and the female points defining the portion profile between point 58 and point 52 are repositioned, again by altering the polar length l to define an arc of a constant radius R.

As discussed above, an initial profile of a male rotor lobe 16 is generated in a manner similar to that used to generate the initial female profile. The initial profile of a male lobe 16 is shown in FIG. 2 as an arc tangent to the male outer diameter 18. The initial profile for the male rotor 12 is then refined a first time using the female profile of FIG. 6. As shown typically in FIG. 2 and for each rotational segment, the distance 43 between each male point, for example starting with male points 45, 47, and each of the female points, starting with for example female point 49, is determined using known methods, and the known location of the closest male point is repositioned by changing its polar length l so that the distance between that male point and the corresponding female point, is equal to the user-defined clearance. This procedure is repeated for a next male point at each rotational segment. As with the female modified profile, this procedure is repeated for each of the male points to generate the roughed out male profile shown in FIG. 7.

After the male and female profiles are roughed out, several refinements are made, as described further below. The refinements are performed to minimize clearances between corresponding male and female profile surfaces, to smooth corresponding driving and driven surfaces, and to provide rotors with good wear characteristics.

In a first, optional refinement, the male tip and the female tip may each be rounded to improve the wear characteristics of the rotors. Using the male tip 32 in FIG. 7, a point 62, 64 on either side of the male tip is repositioned so that the points 32, 62, 64 define a circle of a predetermined radius. The female tip 34 may also be similarly rounded so that points 31, 34, 56 define a circle of another predetermined radius. The predetermined radii should be small compared to the rotor outer diameters, e.g., 0.2 inch. Table 5 shows the female tip and male tip clearances relative to the outer diameters before the tip rounding, and the clearances after the tip rounding are shown in Table 6.

TABLE 5

Female Tip to Female Outer Diameter (housing)

Clearance to housing is −0.00378

Radius is 0.08544

Female Radius at Blow Hole Tangent to Female Outer Diameter (housing)

Clearance to housing is −0.00815

Radius is 0.07117

Male Tip to Male Outer Diameter (housing)

Clearance to housing is −0.00031

Radius is 0.17042

TABLE 6

Female Tip to Female Outer Diameter (housing)

Clearance to housing is −0.00003

Radius is 0.13291

Female Radius at Blow Hole Tangent to Female Outer Diameter (housing)

Clearance to housing is 0.00059

Radius is 0.02206

Male Tip to Male Outer Diameter (housing)

Clearance to housing is −0.00014

Radius is 0.08471

After the first refinement to round the male and female tips, a next refinement to the male and female profiles is performed, and preferably the female profile is refined first. With reference generally to FIG. 7, using the male tip 32, which in this case has been rounded, another iteration is made to calculate the clearance, at each rotational segment, between the three points 32, 62, 64 defining the rounded male tip, and each of the female points. The known location of the particular female point is moved by altering its polar length l to set the clearance between that female point and the rounded male tip to the user-defined distance as the male tip is rotated adjacent to the female points. Table 7 shows the clearances before the additional refinement, and Table 8 shows the clearances afterwards. In the Tables, "t" or "rotation" is a number that indicates the rotational position of a rotor, and is equal to (2×π)/(number of lobes×number of points defining a lobe).

TABLE 7

Clearance Between Rounded Male Tip Before Refinement

| Male Tip Surface | Female Point | Clearance from Female Point | Rotation |
|---|---|---|---|
| 38-39-41 | 9 | 0.00151 | 30 |
| 38-39-41 | 10 | −0.00712 | 29 |
| 38-39-41 | 11 | −0.01165 | 28 |
| 38-39-41 | 12 | −0.01181 | 27 |
| 38-39-41 | 13 | −0.00814 | 27 |
| 38-39-41 | 14 | −0.00516 | 26 |
| 38-39-41 | 15 | −0.00246 | 24 |
| 38-39-41 | 16 | −0.00099 | 23 |
| 38-39-41 | 17 | 0.00157 | 22 |
| 38-39-41 | 18 | 0.00306 | 21 |
| 38-39-41 | 19 | 0.00383 | 20 |
| 38-39-41 | 20 | 0.00394 | 19 |
| 38-39-41 | 21 | 0.00342 | 18 |
| 38-39-41 | 22 | 0.00230 | 17 |
| 38-39-41 | 23 | 0.00049 | 16 |
| 38-39-41 | 24 | −0.00403 | 15 |
| 38-39-41 | 25 | −0.02211 | 14 |
| 38-39-41 | 26 | 0.00095 | 13 |
| 38-39-41 | 27 | −0.00571 | 12 |
| 38-39-41 | 28 | −0.00737 | 11 |
| 38-39-41 | 29 | −0.00925 | 11 |
| 38-39-41 | 30 | −0.01223 | 10 |
| 38-39-41 | 31 | −0.01463 | 9 |
| 38-39-41 | 32 | −0.01555 | 8 |
| 38-39-41 | 33 | −0.01398 | 7 |
| 38-39-41 | 34 | −0.01731 | 7 |
| 38-39-41 | 35 | −0.01887 | 6 |
| 38-39-41 | 36 | −0.01603 | 5 |
| 38-39-41 | 37 | −0.01625 | 5 |

TABLE 8

Clearance Between Rounded Male Tip After Refinement

| Male Tip Surface | Female Point | Clearance at Female Point | Rotation |
|---|---|---|---|
| 38-39-41 | 9 | 0.1675 | 31 |
| 38-39-41 | 10 | 0.01038 | 30 |
| 38-39-41 | 11 | 0.00659 | 29 |
| 38-39-41 | 12 | 0.00428 | 28 |

TABLE 8-continued

Clearance Between Rounded Male Tip After Refinement

| Male Tip Surface | Female Point | Clearance at Female Point | Rotation |
|---|---|---|---|
| 38-39-41 | 13 | 0.00300 | 27 |
| 38-39-41 | 14 | 0.00300 | 26 |
| 38-39-41 | 15 | 0.00300 | 25 |
| 38-39-41 | 16 | 0.00300 | 24 |
| 38-39-41 | 17 | 0.00300 | 23 |
| 38-39-41 | 18 | 0.00300 | 22 |
| 38-39-41 | 19 | 0.00300 | 20 |
| 38-39-41 | 20 | 0.00300 | 19 |
| 38-39-41 | 21 | 0.00300 | 18 |
| 38-39-41 | 22 | 0.00300 | 17 |
| 38-39-41 | 23 | 0.00300 | 16 |
| 38-39-41 | 24 | 0.00300 | 15 |
| 38-39-41 | 25 | 0.00300 | 14 |
| 38-39-41 | 26 | 0.00300 | 13 |
| 38-39-41 | 27 | 0.00292 | 12 |
| 38-39-41 | 28 | 0.00293 | 11 |
| 38-39-41 | 29 | 0.00295 | 10 |
| 38-39-41 | 30 | 0.00306 | 9 |
| 38-39-41 | 31 | 0.00607 | 8 |
| 38-39-41 | 32 | 0.00755 | 8 |
| 38-39-41 | 33 | 0.00532 | 7 |
| 38-39-41 | 34 | 0.00661 | 6 |
| 38-39-41 | 35 | 0.00819 | 5 |
| 38-39-41 | 36 | 0.01017 | 4 |
| 38-39-41 | 37 | 0.00864 | 4 |

The refined female profile is then refined to smooth the profile. Known curve-fitting techniques are used to generate a polynomial describing the profile of the female lobe 26. Such curve-fitting techniques are found, for example, in "Numerical Recipes in C—The Art of Scientific Computing" by William Press, et al. (Cambridge Univ. Press, 2nd ed. 1992). The second derivative of the polynomial is taken, and is evaluated at each point on the profile of the female lobe 26. The variations in the second derivative are analyzed from point to point, and any points at which the evaluated second derivative varies by more than a predetermined value are repositioned so as to smooth the variation at that point to less than the predetermined value. Table 9 shows the second derivatives at points on the unsmoothed female lobe and the once-refined male lobe, and Table 10 shows the second derivatives after the smoothing. The resultant female profile is shown in FIG. 1.

TABLE 9

| Male Point | Value | Male Point | Value | Female Point | Value | Female Point | Value |
|---|---|---|---|---|---|---|---|
| Second Derivatives with Orientation of 3.00 | | | | | | | |
| | | 2 | 3.15 | 1 | −0.14 | 2 | −5.09 |
| 3 | −2.12 | 4 | 0.05 | 3 | 1.62 | 4 | −0.21 |
| 5 | −1.00 | 6 | −1.28 | 5 | 0.29 | 6 | 0.15 |
| 7 | 0.24 | 8 | −2.56 | 7 | 0.19 | 8 | 0.18 |
| 9 | 0.77 | 10 | −3.44 | 9 | 0.18 | 10 | 0.16 |
| 11 | 0.05 | 12 | −1.45 | 11 | 0.23 | 12 | −0.02 |
| 13 | −4.37 | 14 | 0.21 | 13 | 2.43 | 14 | 1.50 |
| 15 | −2.86 | 16 | 9.24 | 15 | 2.40 | 16 | 1.20 |
| 17 | 8.12 | 18 | −4.39 | 17 | 3.34 | 18 | 1.51 |
| 19 | −14.90 | 20 | 118.54 | 19 | 10.21 | 20 | −17.80 |
| 21 | −74.22 | 22 | 28.51 | 21 | 104.82 | 22 | −375.46 |
| 23 | −9.06 | 24 | 0.16 | 23 | 1707.69 | 24 | −7655.88 |
| 25 | −1.71 | 26 | −0.53 | 25 | 6967.93 | 26 | −5984.75 |
| 27 | −3.61 | 28 | 0.26 | 27 | 753.36 | 28 | −772.69 |
| 29 | −1.46 | 30 | −1.57 | 29 | 3.76 | 30 | −71.07 |
| 31 | −0.53 | 32 | −0.55 | 31 | −18.42 | 32 | −11.51 |
| 33 | −2.08 | 34 | 0.70 | 33 | −29.28 | 34 | 63.00 |

TABLE 9-continued

| Male Point | Value | Male Point | Value | Female Point | Value | Female Point | Value |
|---|---|---|---|---|---|---|---|
| 35 | −1.75 | 36 | −0.27 | 35 | −261.00 | 36 | 917.75 |
| 37 | −1.33 | 38 | 0.76 | 37 | −4108.41 | 38 | 1086.82 |
| | | Second Derivatives with Orientation of 2.00 | | | | | |
| — | — | 2 | 35450.00 | 1 | −96.58 | 2 | −11.89 |
| 3 | −64831.4 | 4 | −62761.90 | 3 | 6.67 | 4 | 1.44 |
| 5 | 9039.8 | 6 | −2346.28 | 5 | 2.62 | 6 | 2.13 |
| 7 | 555.66 | 8 | −230.97 | 7 | 2.10 | 8 | 1.94 |
| 9 | 53.90 | 10 | −52.50 | 9 | 1.86 | 10 | 1.71 |
| 11 | 6.79 | 12 | −8.15 | 11 | 1.77 | 12 | 1.11 |
| 13 | −18.98 | 14 | 32.53 | 13 | 15.50 | 14 | 5.11 |
| 15 | −116.31 | 16 | 417.42 | 15 | 5.81 | 16 | 2.14 |
| 17 | −1917.25 | 18 | 3849.17 | 17 | 3.62 | 18 | 2.34 |
| 19 | −1481.30 | 20 | −11.07 | 19 | 2.22 | 20 | 2.09 |
| 21 | 28.81 | 22 | −29.61 | 21 | 1.75 | 22 | 2.91 |
| 23 | 10.47 | 24 | 2.13 | 23 | −0.99 | 24 | 18.06 |
| 25 | 5.62 | 26 | −004 | 25 | −29.65 | 26 | 30.89 |
| 27 | 31.05 | 28 | −3.37 | 27 | −7.93 | 28 | 6.88 |
| 29 | 39.64 | 30 | −2.17 | 29 | 4.22 | 30 | 7.02 |
| 31 | 355.68 | 32 | −1136.03 | 31 | 8.44 | 32 | 10.89 |
| 33 | 5668.54 | 34 | −20376.47 | 33 | 18.85 | 34 | 10.04 |
| 35 | 91707.59 | 36 | −14739.59 | 35 | 79.90 | 36 | −97.68 |
| 37 | 2219.71 | 38 | −699.51 | 37 | −84.45 | 38 | 17.16 |

TABLE 10

| Male | | | | Female | | | |
|---|---|---|---|---|---|---|---|
| | Value | | Value | | Value | | Value |
| | Second Derivatives with Orientation of 3.00 | | | | | | |
| | | 2 | 7.89 | 1 | 16.97 | 2 | −17.92 |
| 3 | −2.83 | 2 | −0.35 | 3 | 5.23 | 4 | −1.07 |
| 5 | −0.75 | 6 | −0.79 | 5 | 0.74 | 6 | −0.18 |
| 7 | −0.47 | 8 | −2.59 | 7 | 0.19 | 8 | −0.34 |
| 9 | 0.84 | 10 | −2.14 | 9 | −0.18 | 10 | 1.06 |
| 11 | −2.00 | 12 | −0.25 | 11 | 1.07 | 12 | 1.33 |
| 13 | −6.65 | 14 | 5.14 | 13 | 1.15 | 14 | 1.85 |
| 15 | −29.62 | 16 | 42.07 | 15 | 1.88 | 16 | 2.26 |
| 17 | −6.33 | 18 | 6.05 | 17 | 2.59 | 18 | 3.94 |
| 19 | −3.48 | 20 | 9.11 | 19 | 0.44 | 20 | 10.89 |
| 21 | 10.35 | 22 | 4.17 | 21 | −8.46 | 22 | 86.96 |
| 23 | −2.08 | 24 | −2.93 | 23 | −268.29 | 24 | 1407.46 |
| 25 | −1.16 | 26 | −4.02 | 25 | −5988.73 | 26 | 37326.31 |
| 27 | −1.13 | 28 | −1.39 | 27 | 97230.13 | 28 | −18469.16 |
| 29 | −1.45 | 30 | −0.96 | 29 | 3701.86 | 30 | −973.91 |
| 31 | −0.98 | 32 | −0.88 | 31 | 211.28 | 32 | −43.21 |
| 33 | −0.82 | 34 | −0.84 | 33 | −134.60 | 34 | 443.44 |
| 35 | −0.66 | 36 | −0.73 | 35 | −1374.71 | 36 | 4770.12 |
| 37 | −0.68 | 38 | −0.86 | 37 | −45311.65 | 38 | 22175.56 |
| | Second Derivatives with Orientation of 2.00 | | | | | | |
| — | — | 2 | −1643.20 | 1 | 1.01 | 2 | −65.65 |
| 3 | 4755.93 | 4 | −18235.6 | 3 | 25.15 | 4 | −0.35 |
| 5 | −2110.92 | 6 | 300.56 | 5 | 7.50 | 6 | −1.73 |
| 7 | −161.07 | 8 | −50.66 | 7 | 2.79 | 8 | −5.38 |
| 9 | 13.86 | 10 | −30.26 | 9 | −2.70 | 10 | 16.07 |
| 11 | −9.11 | 12 | −3.86 | 11 | 11.00 | 12 | 9.51 |
| 13 | −13.28 | 14 | 9.02 | 13 | 5.93 | 14 | 6.59 |
| 15 | −40.98 | 16 | 94.95 | 15 | 4.32 | 16 | 3.54 |
| 17 | −86.06 | 18 | 1718.62 | 17 | 2.88 | 18 | 2.47 |
| 19 | −622.15 | 20 | −398.35 | 19 | 0.88 | 20 | 2.55 |
| 21 | 20.57 | 22 | −11.78 | 21 | 1.94 | 22 | 2.06 |
| 23 | 3.96 | 24 | 3.56 | 23 | 2.09 | 24 | 2.23 |
| 25 | 1.62 | 26 | 14.45 | 25 | 2.38 | 26 | 2.74 |
| 27 | 7.59 | 28 | 23.13 | 27 | 3.09 | 28 | 3.73 |
| 29 | −10.35 | 30 | 192.02 | 29 | 6.78 | 30 | 4.93 |
| 31 | −577.57 | 32 | 2757.86 | 31 | 4.89 | 32 | 6.55 |
| 33 | −10856.7 | 34 | 52432.05 | 33 | 22.15 | 34 | 15.94 |
| 35 | −296799. | 36 | 18935.79 | 35 | 7.61 | 36 | 157.08 |
| 37 | −2754.62 | 38 | 478.10 | 37 | −507.28 | 38 | 230.15 |

The orientation value indicates which portion of the profile is generally horizontally aligned. An orientation of 3 means that the points at an initial end of the profile can be joined by a line or curve that is at least generally horizontally aligned, while a value of 1.5 means that the other end points, i.e., the points at the other end of the profile, are horizontally aligned. Those skilled in the art will recognize that altering the orientation of the profile affects the polynomial that describes the profile, and thus the second derivative at a point. It is not necessary, however, to use more than one orientation.

The profile of the male lobe 16 is then refined for a second time. In the second refinement, the clearances between each male point on the male driving flank and an arc of a circle defined by each set of female triple points along the corresponding female trailing flank is determined. If the clearance exceeds the user-defined value, the clearance between the closest male point and the female triple point arc is modified by repositioning the particular male points to lie on an arc that is concentric to the triple point arc, but separated from the female triple point arc by the user-defined clearance. This process is repeated at each for the rotational segments. Table 11 shows the clearances between the drive surfaces, i.e., the male driving flank and the female driven flank, before the second refinement of the male lobe 16, and Table 12 shows the clearances afterwards.

TABLE 11

Clearance Between Drive Surfaces Before Second Refinement
Point to curve iteration on drive face (+ is a gap)

| Male Point | Female Surface | Clearance | | Rotation |
|---|---|---|---|---|
| 19 | -1-0-1 | −0.00000 | | 0 |
| 20 | 0-1-2 | −0.05410 | Cvx | 4 |
| 21 | 1-2-3 | −0.02063 | Cvx | 7 |
| 22 | 1-2-3 | −0.01059 | Cvx | 10 |
| 23 | 1-2-3 | −0.00473 | Cvx | 12 |
| 24 | 2-3-4 | −0.00073 | Cav | 13 |
| 25 | 3-4-5 | −0.00031 | Cav | 14 |
| 26 | 4-5-6 | −0.00133 | Cav | 15 |
| 27 | 4-5-6 | 0.00002 | Cav | 16 |
| 28 | 4-5-6 | −0.00040 | Cav | 17 |

TABLE 11-continued

| Clearance Between Drive Surfaces Before Second Refinement Point to curve iteration on drive face (+ is a gap) | | | | |
|---|---|---|---|---|
| 29 | 4-5-6 | −0.00073 | Cav | 18 |
| 30 | 5-6-7 | 0.00003 | Cav | 19 |
| 31 | 5-6-7 | −0.00008 | Cav | 20 |
| 32 | 5-6-7 | −0.00056 | Cav | 21 |
| 33 | 7-8-9 | 0.00134 | Cav | 21 |
| 34 | 8-9-10 | −0.00068 | Cav | 22 |
| 35 | 7-8-9 | −0.00008 | Cav | 24 |
| 36 | 8-9-10 | −0.00073 | Cav | 25 |
| 37 | 10-11-12 | −0.00041 | Cav | 26 |
| 38 | 10-11-12 | −0.00253 | Cav | 27 |
| Female Point | Male Surface | Clearance | | Rotation |
| 1 | 19-20-21 | −0.05296 | Cvx | 2 |
| 2 | 19-20-21 | −0.02587 | Cvx | 4 |
| 3 | 22-23-24 | −0.00457 | Cvx | 9 |
| 4 | 25-26-27 | −0.00122 | Cvx | 15 |
| 5 | 27-28-29 | −0.00032 | Cvx | 17 |
| 6 | 28-29-30 | −0.00037 | Cvx | 18 |
| 7 | 31-32-33 | −0.00090 | Cvx | 20 |
| 8 | 33-34-35 | −0.00105 | Cvx | 23 |
| 9 | 35-36-37 | −0.00074 | Cvx | 24 |
| 10 | 35-36-37 | −0.00084 | Cvx | 25 |
| 11 | 37-38-39 | −0.00245 | Cvx | 27 |
| 12 | 37-38-39 | −0.00151 | Cvx | 27 |

TABLE 12

| Clearance Between Drive Surfaces After Second Refinement | | | | |
|---|---|---|---|---|
| Male Point | Female Surface | Clearance | | Rotation |
| 19 | 1-2-3 | 0.00216 | Cvx | 1 |
| 20 | 0-1-2 | 0.00202 | Cvx | 2 |
| 21 | 0-1-2 | 0.00000 | Cvx | 5 |
| 22 | 1-2-3 | 0.00000 | Cvx | 9 |
| 23 | 1-2-3 | −0.00000 | Cvx | 12 |
| 24 | 1-2-3 | −0.00000 | Cvx | 14 |
| 25 | 1-2-3 | −0.00000 | Cvx | 16 |
| 26 | 3-4-5 | −0.00000 | Cav | 16 |
| 27 | 3-4-5 | −0.00000 | Cav | 17 |
| 28 | 3-4-5 | −0.00000 | Cav | 18 |
| 29 | 5-6-7 | −0.00000 | Cav | 18 |
| 30 | 5-6-7 | −0.00000 | Cav | 19 |
| 31 | 5-6-7 | 0.00000 | Cav | 20 |
| 32 | 5-6-7 | 0.00000 | Cav | 21 |
| 33 | 6-7-8 | 0.00001 | Cav | 22 |
| 34 | 7-8-9 | 0.00004 | Cvx | 23 |
| 35 | 7-8-9 | 0.0008 | Cvx | 24 |
| 36 | 7-8-9 | 0.00025 | Cvx | 26 |
| 37 | 9-10-11 | 0.00043 | Cav | 27 |
| 38 | −1-0-1 | −0.00000 | | 0 |
| Female Point | Male Surface | Clearance | | Rotation |
| 1 | 19-20-21 | 0.00219 | Cav | 2 |
| 2 | 21-22-23 | −0.00079 | Cvx | 7 |
| 3 | 24-25-26 | 0.00094 | Cvx | 15 |
| 4 | 25-26-27 | −0.00025 | Cvx | 16 |
| 5 | 27-28-29 | −0.00035 | Cvx | 18 |
| 6 | 30-31-32 | −0.00007 | Cvx | 20 |
| 7 | 32-33-34 | 0.00000 | Cvx | 22 |
| 8 | 34-35-36 | −0.00009 | Cvx | 24 |
| 9 | 36-37-38 | −0.00185 | Cvx | 27 |
| 10 | 36-37-38 | −0.00061 | Cvx | 26 |
| 11 | 36-37-38 | 0.00201 | Cvx | 26 |
| 12 | 36-37-38 | 0.00533 | Cvx | 26 |

The third refinement of the male lobe 16, this time to the male trailing flank is then performed, and the portions of the male lobe that rotate near the female tip 34 adjacent to the female leading flank, are analyzed to minimize the clearances. With reference to FIG. 8, the clearance between each of the female points 43, 45, 49 and corresponding male triple points are evaluated as the rotors are rotated in opposite directions relative to one another. The points along the profile of the male rotor 12 are adjusted as necessary to maintain clearances between male triple points and female triple points at the user-defined clearance. The resultant male lobe profile is seen in FIG. 1. Table 13 shows the clearances before the third refinement, and Table 14 shows the clearances after refinement.

TABLE 13

| Clearance Between Female Tip Points on the Female Leading Flank and Male Trailing Flank Before Refinement | | | | |
|---|---|---|---|---|
| Female Point | Male Point | Clearance at male surface | | Rotation |
| 36 | 1 | −0.00182 | Cvx | 8 |
| 36 | 2 | −0.00192 | Cvx | 8 |
| 36 | 3 | −0.00031 | Cvx | 10 |
| 36 | 4 | −0.00083 | Cvx | 11 |
| 36 | 5 | −0.00084 | Cvx | 12 |
| 36 | 6 | 0.00088 | Cvx | 14 |
| 36 | 7 | 0.00016 | Cvx | 15 |
| 36 | 8 | 0.00218 | Cvx | 17 |
| 36 | 9 | 0.00151 | Cvx | 18 |
| 36 | 10 | 0.00497 | Cvx | 21 |
| 36 | 12 | 0.00486 | Cvx | 22 |
| 37 | 2 | 0.00080 | Cvx | 8 |
| 37 | 3 | 0.00152 | Cvx | 9 |
| 37 | 4 | −0.00012 | Cvx | 12 |
| 37 | 5 | −0.00014 | Cvx | 12 |
| 37 | 6 | 0.00056 | Cvx | 13 |
| 37 | 7 | −0.00081 | Cvx | 15 |
| 37 | 8 | 0.00016 | Cvx | 16 |
| 37 | 9 | −0.00110 | Cvx | 17 |
| 37 | 10 | 0.00048 | Cvx | 19 |
| 37 | 12 | −0.00135 | Cvx | 23 |
| 37 | 13 | −0.00614 | Cvx | 31 |
| 37 | 14 | −0.00648 | Cvx | 32 |
| 38 | 3 | 0.05042 | Cvx | 8 |
| 38 | 13 | 0.03936 | Cvx | 22 |
| 38 | 14 | −0.00213 | Cvx | 35 |
| 38 | 15 | −0.00588 | Cav | 35 |
| 38 | 16 | −0.00531 | Cav | 35 |

TABLE 14

| Clearance Between Female Tip Points on the Female Leading Flank and Male Trailing Flank After Refinement | | | | |
|---|---|---|---|---|
| Female Point | Male Point | Clearance at male surface | | Rotation |
| 36 | 1 | 0.00510 | Cvx | 5 |
| 36 | 2 | 0.00453 | Cvx | 7 |
| 36 | 3 | 0.00287 | Cvx | 8 |
| 36 | 4 | 0.00453 | Cvx | 11 |
| 36 | 5 | 0.00451 | Cvx | 12 |
| 36 | 7 | 0.00365 | Cvx | 14 |
| 36 | 8 | 0.00622 | Cvx | 16 |
| 36 | 9 | 0.00509 | Cvx | 18 |
| 36 | 10 | 0.00512 | Cvx | 18 |
| 36 | 11 | 0.00581 | Cvx | 21 |
| 36 | 12 | 0.00533 | Cvx | 21 |
| 36 | 13 | 0.00742 | Cvx | 25 |
| 36 | 14 | 0.00622 | Cvx | 26 |
| 36 | 16 | 0.01035 | Cav | 34 |
| 37 | 1 | 0.00444 | Cvx | 5 |
| 37 | 2 | 0.00228 | Cvx | 7 |
| 37 | 3 | 0.00216 | Cvx | 8 |
| 37 | 4 | 0.00318 | Cvx | 10 |
| 37 | 5 | 0.00313 | Cvx | 10 |
| 37 | 7 | 0.00178 | Cvx | 14 |
| 37 | 8 | 0.00366 | Cvx | 15 |

TABLE 14-continued

| Clearance Between Female Tip Points on the Female Leading Flank and Male Trailing Flank After Refinement | | | | |
|---|---|---|---|---|
| Female Point | Male Point | Clearance at male surface | | Rotation |
| 37 | 9 | 0.00231 | Cvx | 18 |
| 37 | 10 | 0.00232 | Cvx | 18 |
| 37 | 11 | 0.00255 | Cvx | 19 |
| 37 | 12 | 0.00174 | Cvx | 21 |
| 37 | 13 | 0.00310 | Cvx | 24 |
| 37 | 14 | 0.00123 | Cvx | 26 |
| 37 | 16 | 0.00517 | Cav | 34 |
| 38 | 3 | 0.02879 | Cvx | 8 |
| 38 | 4 | 0.02939 | Cvx | 10 |
| 37 | 5 | 0.00313 | Cvx | 10 |
| 38 | 7 | 0.02749 | Cvx | 14 |
| 38 | 8 | 0.02918 | Cvx | 15 |
| 37 | 9 | 0.00231 | Cvx | 18 |
| 37 | 10 | 0.00232 | Cvx | 18 |
| 37 | 11 | 0.00255 | Cvx | 19 |
| 38 | 12 | 0.02584 | Cvx | 21 |
| 38 | 13 | 0.02682 | Cvx | 23 |
| 38 | 14 | 0.02418 | Cvx | 26 |
| 38 | 15 | −0.00740 | Cav | 35 |
| 38 | 16 | −0.00884 | Cav | 35 |
| 38 | 17 | −0.00862 | Cav | 35 |

Female points 36, 48, 50 in the Figs. correspond to the points "36", "37", "38" respectively, in the Tables.

Finally, the points defining the male and female lobes are more finely refined. In this refinement, additional points are inserted between the existing male points and female points and are used to produce finer, smoother male and female profile(s). Preferably, the additional points are inserted midway along a segment between each pair of existing points, i.e., halfway between the existing points. The profiles with additional points are refined using one of the methods described above to refine the profiles. More specifically, a point on one rotor is used to reposition a corresponding triple point on the other rotor so that the point and the triple points are separated by the user-defined distance. The female rotor 22 is more finely refined first.

Starting at one portion of a female lobe 26, the clearance of a female point is evaluated relative to an adjacent male triple point, and the female point is repositioned as necessary so that the clearance is equal to or less than the user-defined clearance. The rotors 12, 22 are rotated approximately one half of one rotational segment, since each "segment" is about one half of each previous segment, and the process is repeated. When all of the female points have been further refined, the process is performed for the points which define the female lobe 16 to more finely refine the male lobe 26.

After the finer refinement is completed for both lobes 16, 26, the profile for each lobe is again smoothed as described above, i.e., a polynomial is generated for each profile as defined by the more finely refined points, the second derivative is evaluated at each point, and known locations of any points at which the second derivative varies by more than a predetermined amount are moved so that the variation in the second derivative at each point varies by less than the predetermined amount. After generating the resultant profiles for at least one lobe for each rotor, as typically shown in FIG. 1, for the male and female lobes 16, 26, successive male and female lobe profiles are generated, for example by repeating the same coordinates describing each resultant lobe profile around the respective rotors, to add the beginning of a successive lobe onto an end of the previous lobe. That is, the same polar coordinates are repeated around the rotor to provide the correct number of lobes equally spaced on a rotor.

If desired, additional points to define a lobe are generated using one of many known interpolation technique. One such equation is a "cubic" spline interpolation found in the above-referenced "Numerical recipes in C" publication. The points which define the lobes are than used by a rotor manufacturer to actually fabricate the rotors. The manufacturer, such as American-Pfauter of Love's Park, Ill., or Holroyd of Rochdale, England, use the points to develop a cutting tools that are used, to cut rotors with a rotor-cutting machine having the male and female generated profiles from blanks.

As will also be noted by those skilled in the art, the resultant profiles of the male rotor 12 and the female rotor 14 can be used to evaluate parameters of the compressor, or other apparatus as may be the case, such as the total leakage area between the rotors, leakage volume, pressure angles of the rotors, conjugacy deviation, flow volume, and power calculation. Conjugacy deviation, shown in Table 15 and FIG. 12, is defined by the distance between (1) the point of intersection of the line between the rotor centers 14,24, and the intersection of the rotor pitch diameters which occurs on that line, and (2) the point of intersection of the line between the rotor centers 14, 24 and a line perpendicular to a line tangent to the intersecting surfaces of the rotors. The conjugacy deviation is ideally equal to 0, i.e., points (1) and (2) are coincident. Total leakage between the resultant profiles is shown in Table 16. "Ax" is a non-dimensional axial parameter, which transforms into the axial distance according to the following equation:

$$\text{Axial Distance} = \frac{((Ax) \times (\pi) \times (\text{male pitch diameter}))}{(\tan(\text{helix angle}) \times (\#\ \text{male lobes}) \times (\#\ \text{points defining a lobe}))}.$$

As will be recognized by those skilled in the pertinent art, the helix angle is the same for each of the rotors.

TABLE 15

| Male Points | Female Points | Clearance | | Rotation | Conjugacy Deviation | Pressure Angle |
|---|---|---|---|---|---|---|
| 19-20-21 | 0-1-2 | 0.00993 | Cave ml | −2 | −0.4168 | −80.9 |
| 20-21-22 | 1-2-3 | 0.00837 | Cave ml | 0 | 0.1339 | 52.6 |
| 21-22-23 | 0-1-2 | 0.00058 | Convex | 11 | 0.0016 | 21.9 |
| 22-23-24 | 2-3-4 | 0.00319 | Cave fe | 12 | 0.0021 | 22.4 |
| 23-24-25 | 3-4-5 | 0.00322 | Cave fe | 12 | −0.0003 | 22.3 |
| 24-25-26 | 2-3-4 | −0.00049 | Cave fe | 15 | 0.0027 | 27.1 |
| 25-26-27 | 5-6-7 | 0.00176 | Cave fe | 12 | −0.0025 | 24.5 |
| 26-27-28 | 5-6-7 | 0.00070 | Cave fe | 14 | −0.0017 | 27.1 |
| 27-28-29 | 4-5-6 | −0.00039 | Cave fe | 17 | 0.0032 | 30.3 |
| 19-20-21 | 0-1-2 | 0.00993 | Cave ml | −2 | −0.4168 | -80.9 |
| 20-21-22 | 1-2-3 | 0.00837 | Cave ml | 0 | 0.1339 | 52.6 |
| 23-24-25 | 2-3-4 | 0.00322 | Cave fe | 12 | −0.0003 | 22.3 |
| 23-24-25 | 3-4-5 | 0.00322 | Cave fe | 12 | −0.0003 | 22.3 |
| 25-26-27 | 4-5-6 | −0.00017 | Cave | 14 | −0.0023 | 25.4 |

TABLE 15-continued

| Male Points | Female Points | Clear-ance | | Rota-tion | Con-jugacy De-viation | Pres-sure Angle |
|---|---|---|---|---|---|---|
| | | | fe | | | |
| 25-26-27 | 5-6-7 | 0.00176 | Cave fe | 12 | −0.0025 | 24.5 |
| 33-34-35 | 6-7-8 | 0.00012 | Cave fe | 23 | 0.0017 | 38.8 |
| 28-29-30 | 7-8-9 | 0.00272 | Con-vex | 15 | 0.0019 | 30.8 |
| 29-30-31 | 7-8-9 | 0.00205 | Con-vex | 16 | 0.0014 | 31.8 |
| 31-32-33 | 3-4-5 | −0.00199 | Cave fe | 24 | 0.0042 | 42.5 |
| 32-33-34 | 3-4-5 | −0.00249 | Cave fe | 25 | −0.0013 | 44.2 |
| 33-34-35 | 7-8-9 | 0.00002 | Con-vex | 23 | 0.0011 | 38.8 |
| 35-36-37 | 8-9-10 | −0.00009 | Cave fe | 25 | 0.0005 | 40.7 |
| 36-37-38 | 9-10-11 | −0.00205 | Cave fe | 27 | −0.0130 | 40.5 |
| 36-37-38 | 8-9-10 | −0.00189 | Cave fe | 27 | −0.0241 | 43.2 |
| 36-37-38 | 9-10-11 | −0.00205 | Cave fe | 27 | −0.0130 | 40.5 |
| 37-38-39 | 11-12-13 | −0.00938 | Cave ml | 27 | −0.0024 | 55.5 |
| 37-38-39 | 12-13-14 | −0.00940 | Cave ml | 27 | −0.0039 | 55.5 |

TABLE 16

| ax | Female Point | Clearance | Male Point |
|---|---|---|---|
| | Clearance Between Meshing Points | | |
| 0 | 39 | 0.00177 | 17 |
| 1 | 3 | 0.00113 | 21 |
| 2 | 3 | −0.00301 | 21 |
| 3 | 3 | −0.00657 | 21 |
| 4 | 1 | 0.00000 | 21 |
| 5 | 1 | 0.00232 | 21 |
| 6 | 2 | 0.00446 | 22 |
| 7 | 2 | 0.00056 | 22 |
| 8 | 2 | 0.00000 | 22 |
| 9 | 3 | 0.00114 | 22 |
| 10 | 2 | 0.00140 | 23 |
| 11 | 2 | −0.00000 | 23 |
| 12 | 3 | 0.00247 | 24 |
| 13 | 2 | −0.00000 | 24 |
| 14 | 4 | 0.00018 | 25 |
| 15 | 2 | −0.00000 | 25 |
| 16 | 6 | −0.00005 | 28 |
| 17 | 4 | −0.00000 | 28 |
| 18 | 6 | −0.00000 | 30 |
| 19 | 5 | −0.00012 | 31 |
| 20 | 6 | 0.00000 | 32 |
| 21 | 8 | −0.00003 | 33 |
| 22 | 9 | −0.00012 | 34 |
| 23 | 7 | −0.00010 | 25 |
| 24 | 9 | 0.00079 | 36 |
| 25 | 7 | 0.00010 | 36 |
| 26 | 10 | 0.00043 | 37 |
| 27 | 9 | 0.00067 | 37 |
| 28 | 7 | 0.00585 | 37 |
| 29 | 0 | 0.00000 | 0 |
| 30 | 0 | 0.00000 | 0 |
| 31 | 0 | 0.00000 | 0 |
| 32 | 0 | 0.00000 | 0 |
| 33 | 0 | 0.00000 | 0 |
| 34 | 0 | 0.00000 | 0 |
| 35 | 0 | 0.00000 | 0 |
| 4 | 37 | 0.00864 | 40 |

TABLE 16-continued

| ax | Female Point | Clearance | Male Point |
|---|---|---|---|
| 5 | 37 | 0.00444 | 40 |
| 6 | 35 | 0.00432 | 40 |
| 7 | 34 | 0.003376 | 40 |
| 8 | 33 | 0.00431 | 40 |
| 9 | 30 | 0.00306 | 40 |
| 10 | 29 | 0.00295 | 40 |
| 11 | 28 | 0.00293 | 40 |
| 12 | 27 | 0.00292 | 40 |
| 13 | 26 | 0.00300 | 40 |
| 14 | 25 | 0.00300 | 40 |
| 15 | 24 | 0.00300 | 40 |
| 16 | 23 | 0.00300 | 40 |
| 17 | 22 | 0.00300 | 40 |
| 18 | 21 | 0.00300 | 40 |
| 19 | 20 | 0.00300 | 40 |
| 20 | 19 | 0.00300 | 40 |
| 21 | 19 | 0.00300 | 40 |
| 22 | 18 | 0.00300 | 40 |
| 23 | 17 | 0.00300 | 40 |
| 24 | 16 | 0.00300 | 40 |
| 25 | 15 | 0.00300 | 40 |
| 26 | 14 | 0.00300 | 40 |
| 27 | 13 | 0.00300 | 40 |
| | Clearance Between Male Tip and Female Points | | |
| 4 | 37 | 0.00864 | 40 |
| 5 | 37 | 0.00444 | 40 |
| 6 | 35 | 0.00432 | 40 |
| 7 | 34 | 0.00376 | 40 |
| 8 | 33 | 0.00431 | 40 |
| 9 | 30 | 0.00306 | 40 |
| 10 | 29 | 0.00295 | 40 |
| 11 | 28 | 0.00293 | 40 |
| 12 | 27 | 0.00292 | 40 |
| 13 | 26 | 0.00300 | 40 |
| 14 | 25 | 0.00300 | 40 |
| 15 | 24 | 0.00300 | 40 |
| 16 | 23 | 0.00300 | 40 |
| 17 | 22 | 0.00300 | 40 |
| 18 | 21 | 0.00300 | 40 |
| 19 | 20 | 0.00300 | 40 |
| 20 | 19 | 0.00300 | 40 |
| 21 | 19 | 0.00300 | 40 |
| 22 | 18 | 0.00300 | 40 |
| 23 | 17 | 0.00300 | 40 |
| 24 | 16 | 0.00300 | 40 |
| 25 | 15 | 0.00300 | 40 |
| 26 | 14 | 0.00300 | 40 |
| 27 | 13 | 0.00300 | 40 |
| 28 | 12 | 0.00428 | 40 |
| | Clearance Between Female Tip and Male Points | | |
| 0 | 0 | 0.00000 | 0 |
| 1 | 0 | 0.00000 | 0 |
| 2 | 0 | 0.00000 | 0 |
| 3 | 37 | 0.02966 | 1 |
| 4 | 37 | 0.01034 | 2 |
| 5 | 37 | 0.00444 | 1 |
| 6 | 37 | 0.00335 | 2 |
| 7 | 37 | 0.00205 | 4 |
| 8 | 37 | 0.00216 | 3 |
| 9 | 37 | 0.00263 | 3 |
| 10 | 37 | 0.00313 | 5 |
| 11 | 37 | 0.00311 | 5 |
| 12 | 37 | 0.00281 | 4 |
| 13 | 37 | 0.00218 | 7 |
| 14 | 37 | 0.00161 | 8 |
| 15 | 37 | 0.00114 | 6 |
| 16 | 37 | 0.00298 | 10 |
| 17 | 37 | 0.00178 | 8 |
| 18 | 37 | 0.00228 | 11 |
| 19 | 37 | 0.00243 | 10 |
| 20 | 37 | 0.00227 | 12 |
| 21 | 37 | 0.00073 | 13 |
| 22 | 37 | 0.00138 | 11 |
| 23 | 37 | 0.00239 | 12 |

TABLE 16-continued

| ax | Female Point | Clearance | Male Point |
|---|---|---|---|
| 24 | 37 | 0.00305 | 14 |
| 25 | 37 | −0.01376 | 15 |
| 26 | 36 | −0.00503 | 15 |
| 27 | 37 | −0.00009 | 13 |
| 28 | 37 | 0.00186 | 14 |
| 29 | 37 | 0.00249 | 14 |
| 30 | 37 | 0.00315 | 14 |
| 31 | 37 | 0.00205 | 16 |
| 32 | 37 | −0.00201 | 16 |
| 33 | 38 | −0.00578 | 16 |
| 34 | 38 | −0.00842 | 16 |
| 35 | 38 | −0.00884 | 16 |
| 36 | 38 | −0.00687 | 16 |
| 37 | 38 | −0.00239 | 16 |
| 38 | 38 | 0.00467 | 16 |
| 39 | 39 | 0.00686 | 17 |
| 40 | 39 | 0.00303 | 17 |
| 41 | 39 | 0.00177 | 17 |
| 42 | 1 | 0.00274 | 20 |
| 43 | 1 | 0.00219 | 20 |

Having described a method of generating refined rotor profiles in accordance with the present invention above, an apparatus for generating the refined rotor profiles is now described. The apparatus, indicated in FIG. 10 generally by the numeral 68 includes a processor 70 connected to a keyboard 72 or other input device, and a memory storage 74 device. The keyboard 72 is used for input of the initial parameters discussed above, the user-defined clearance, the helix angle of the male rotor and of the female rotor and any other pertinent information, such as the working fluid, and from which signals indicative thereof are generated. The keyboard 72 can also be used to modify the position of a point, i.e., the polar coordinate of a point, if desired, to better distribute the points along a profile. The apparatus also includes a machine 76 for producing the rotors having the refined profiles that are generated using the above-described method.

The processor 70 uses the signals indicative of the initial parameters to generate signals indicative of positions for at least one male and one female rotor tip positioned at known locations around each respective diameter 18 or 28. The offset parameter 46 is used to establish the initial relative orientation of the male rotor and the female rotor. The processor 70 calculates the known locations of the other initial male and female points, and generates signals indicative thereof, as the male tip 34 is rotated in segments through the female rotor 22, as previously described. After the rotors are rotated a segment, the known location of the male tip 34 is used to reposition a corresponding female point also positioned at a new, known location, and a signal is generated indicative of that location. The signal indicative of the location is transmitted to and stored in the memory 74. As the rotors are rotated another segment, each existing point is moved a corresponding amount, i.e., an amount corresponding to the rotational amount and the distance of the point from the respective rotor center, the processor 70 calculates new positions for each existing point, and creates a new female point corresponding to the new position of the male tip 34. After the initial female profile is generated, the initial male points are generated as described above. Signals indicative of the known locations are generated for each of the points, as are signals indicative of the movement of the points as the profiles are rotated.

The processor 70 refines the profiles for the rotors as described above, using signals indicative of, for example, the known locations of the points stored in memory 74, measured distances, and predetermined values to generate the resultant, refined profiles which are shown typically in FIG. 1. After the processor 70 generates the coordinates for the points defining the resultant male and female rotor profiles, signals indicative of the points are transmitted to a machine, such as a rotor cutter manufactured by the Holroyd Co., to generate tools to machine the rotors from, for example, metal blanks. Alternatively, the signals indicative of the points defining the resultant profiles may be stored in a magnetic storage device (not shown) for subsequent use.

From the foregoing, a novel method and apparatus for refining rotor profiles have been disclosed in some detail. However, it is noted by those skilled in the art that numerous modifications and substitutions can be made without departing from the spirit of the invention or the scope of the appended claims. For example, it may be desirable to provide a cylindrical surface upon which the male rotor outer diameter 18 is supported while actually fabricating, i.e., machining, the male rotor. This cylindrical surface may be created after generating the resultant male profile by providing a small land at the male tip. The land is created, for example, by repositioning a male point that is adjacent to a male tip so that the male point is positioned on the male diameter, and also so that a small angle, e.g., 0.013 radians is defined between the male point, male center and male tip. Accordingly, the present invention has been described in several preferred embodiments by way of illustration rather than by limitation.

What is claimed is:

1. An apparatus for generating complete, refined profiles for cooperating screw rotors including a first rotor and a second rotor each having an axial length and a profile indicative of a cross section of a rotor taken perpendicular to the axial length, the first rotor has a preselected number of identically-shaped male lobes each being defined by generally convex surfaces, the second rotor has a preselected number of identically-shaped female lobes each being defined by generally concave surfaces, the apparatus comprising:

means for receiving signals indicative of a plurality of initial parameters for a first rotor and for a second rotor cooperating with the first rotor, the initial parameters including at least the outer diameters of the respective rotors, the number of lobes on the respective rotors, the distance between centers of the first and second rotors, and an offset indicative of an initial relative orientation of the first and second rotors;

means for generating signals indicative of an initial profile for one lobe of the first rotor defined by a first plurality of points positioned along the first rotor initial profile and for generating signals indicative of an initial profile for one lobe of the second rotor defined by a second plurality of points positioned along the second rotor initial profile, the signals indicative of the first and second rotor initial profiles being generated in accordance with the signals indicative of the initial parameters and the second rotor being adjacent to the first rotor;

means for measuring the distances between each of the first plurality of points and each of the second plurality points and for generating signals indicative of the measured distances;

means for comparing the signals indicative of the measured distances for determining the signal indicative of the shortest distance of the measured distances;

means for comparing the signal indicative of the shortest distance with a signal indicative of a predetermined clearance;

means for refining the initial profile for the first rotor lobe and the initial profile for the second rotor lobe by repositioning at least one of the respective points defining the shortest distance toward the other of the respective points to define a new distance less than or equal to the predetermined clearance and greater than zero; and means for generating signals indicative of a complete, refined profile for the first rotor by repeating the refined profile for the first rotor lobe around the first pitch diameter to generate the first number of lobes, and a complete, refined profile for the second rotor by repeating the refined profile for the second rotor lobe around the second pitch diameter to generate the second number of lobes.

2. The apparatus as defined in claim 1, further comprising:

means for generating signals indicative of a plurality of initial parameters for a first rotor and for a second rotor, including at least the outer diameters of the rotors, the numbers of lobes on the rotors, and the distance between the centers of the first rotor and the second rotor.

3. The apparatus as defined in claim 1, wherein the means for generating the refined profiles for the first and second rotors also generates signals indicative of new positions of the refined profiles by repositioning each of the points defining the refined profiles so as to rotate the refined profiles by respective first and second predetermined amounts and in directions opposite to one another.

4. The apparatus as defined in claim 1, wherein the signals indicative of the initial parameters further includes signals indicative of a helix angle for the first rotor and a helix angle for the second rotor, the apparatus further comprising:

means for producing the first rotor and the second rotor in accordance with the signals indicative of the refined profiles of the first and second rotors and the signals indicative of the helix angles for the first and second rotors.

5. The apparatus as defined in claim 1, wherein the means for refining the initial profiles repositions one of the respective points defining the shortest distance.

6. The apparatus as defined in claim 1, wherein the means for refining the initial profiles repositions the known locations of the points defining the second rotor.

7. The apparatus as defined in claim 1, further comprising:

means for generating signals indicative of an at least second order polynomial describing the refined profile for one of the refined profiles;

means for generating signals indicative of the second derivative of the at least second order polynomial;

means for evaluating the signals indicative of the second derivative at each point defining the one of the refined profiles and for generating signals indicative of the evaluated second derivative at each point;

means for comparing the signal indicative of the evaluated second derivative at each of the points defining the one of the refined profiles and determining the variation of the signals indicative of the evaluated second derivative at each of the points; and means for generating a signal indicative of repositioning a point at which the variation exceeds the predetermined maximum value so that the variation is less than or equal to the predetermined maximum value, if it is determined by the comparing means that the variation of the evaluated second derivative at a point exceeds the maximum predetermined value.

8. The apparatus as defined in claim 1, wherein the means for generating signals indicative of the initial profiles and the means for generating signals indicative of the refined profiles comprise a processor.

9. The apparatus as defined in claim 8, further comprising a display in communication with the processor for visually displaying at least the initial profiles of the first and second rotors.

10. A method of generating complete, refined profiles for cooperating screw rotors including a first rotor and a second rotor each having an axial length and a profile indicative of a cross section of a rotor taken perpendicular to the axial length, the first rotor has a preselected number of identically-shaped male lobes each being defined by generally convex surfaces, the second rotor has a preselected number of identically-shaped female lobes each being defined by generally concave surfaces, the method comprising the steps of:

receiving signals indicative of a plurality of initial parameters for a first rotor and a second rotor cooperating with the first rotor, including at least signals indicative of the outer diameters of the rotors, the numbers of lobes for the rotors, a distance between the centers of the first rotor and the second rotor, and an offset indicative of an initial relative orientation of the first and second rotors;

generating signals indicative of an initial profile for one lobe of the first rotor and signals indicative of an initial profile for one lobe of the second rotor in response to the signals indicative of the plurality of initial parameters, the initial profile for the one lobe of the first rotor being defined by a first plurality of points positioned at known locations and the initial profile for the one lobe of the second rotor being defined by a second plurality of points positioned at known locations;

measuring the distances between each of the first plurality of points and each of the second plurality of points and for generating a signal indicative of each of the measured distances;

comparing the signals indicative of each of the measured distances and determining the shortest distance of the measured distances;

generating a signal indicative of the shortest distance of the measured distances;

comparing the signal indicative of the shortest distance to a signal indicative of a predetermined clearance;

refining the initial profile for the first rotor and the initial profile for the second rotor by repositioning one point of the respective points defining the shortest distance toward the other point of the respective points to define a new distance less than or equal to the predetermined clearance and greater than zero, if it is determined during the step of comparing the shortest distance that the shortest distance is not equal to the predetermined clearance; and generating signals indicative of the complete, refined profile for the first rotor by repeating the refined profile for the first rotor lobe around the first pitch diameter to generate the first number of lobes, and a complete, refined profile for the second rotor by repeating the refined profile for the second rotor lobe around the second pitch diameter to generate the second number of lobes.

11. The method as defined in claim 10, further comprising the steps of:

generating signals indicative of new positions of the refined profiles by repositioning each of the points defining the refined profiles so as to rotate the refined profiles about the respective centers by respective first and second predetermined amounts and in directions opposite to one another; and repeating the steps of measuring, comparing, determining and refining prior to the step of generating signals indicative of the refined profiles for the first and second rotors.

12. The method as defined in claim 11, further comprising the step of:

repeating the steps of generating signals indicative of new positions and repeating a predetermined number of times.

13. The method as defined in claim 10, wherein the step of receiving signals indicative of initial parameters includes receiving signals indicative of a helix angle for the first rotor and a helix angle for the second rotor, and further comprising the step of:

producing the first rotor and the second rotor in accordance with the signals indicative of the refined profile for the first rotor and the signals indicative of the refined profile for the second rotor and the signals indicative of the helix angles of the first and second rotors.

14. The method as defined in claim 10, wherein the step of refining is performed by repositioning the known positions of a point defining the second rotor.

15. The method as defined in claim 10, further comprising the step of:

further refining the refined profiles by repositioning a point defining each of the profiles adjacent to the respective outer diameter.

16. The method as defined in claim 10, further comprising the steps of:

generating signals indicative of an at least second order polynomial describing the refined profile for one of the refined profiles;

generating signals indicative of the second derivative of the polynomial;

evaluating the signals indicative of the second derivative at each point defining the one of the refined profiles;

generating a signal indicative of the evaluated second derivative at each of the points defining the one of the refined profiles;

comparing the signals indicative of the evaluated second derivative at each of the points defining the one of the refined profiles and determining the variation of the signals indicative of the evaluated second derivative at each of the points;

generating a signal indicative of the variation of the evaluated second derivative at each of the points;

comparing the signal indicative of the variation with a signal indicative of a predetermined maximum variation; and repositioning a point at which the variation exceeds the predetermined maximum value to further refine the profiles so that the variation is less than or equal to the predetermined maximum value, if it is determined during the step of comparing that the signal indicative of the variation at a point exceeds the predetermined maximum value.

17. The method as defined in claim 10, further comprising the step of:

generating signals indicative of a plurality of parameters for a first rotor and a second rotor cooperating with the first rotor, including at least signals indicative of the outer diameters of the rotors, the number of lobes for the rotors and a distance between the centers of the rotors.

18. A cooperating pair of first and second rotors made in accordance with a method comprising the steps of:

receiving signals indicative of a plurality of initial parameters for a first rotor and a second rotor cooperating with the first rotor, including at least signals indicative of the outer diameters of the rotors, the numbers of lobes for the rotors, the helix angles of the rotors, and a distance between the centers of the first rotor and the second rotor;

generating signals indicative of an initial profile for one lobe of the first rotor and signals indicative of an initial profile for one lobe of the second rotor in response to the signals indicative of the plurality of initial parameters, the initial profile for the one lobe of the first rotor being defined by a first plurality of points positioned at known locations and the initial profile for the one lobe of the second rotor being defined by a second plurality of points positioned at known locations separate from the known locations of the first plurality of points;

measuring the distances between each of the first plurality of points and each of the second plurality of points and generating a signal indicative of each of the measured distances;

comparing the signals indicative of each of the measured distances and determining the shortest distance of the measured distances;

generating a signal indicative of the shortest distance of the measured distances;

comparing the signal indicative of the shortest distance to the signal indicative of a predetermined maximum value;

refining the initial profile for the first rotor and the initial profile for the second rotor by repositioning one of the respective points defining the shortest distance toward the other point to define a new distance less than or equal to the predetermined maximum value and greater than zero, if it is determined during the step of comparing the shortest distance that the shortest distance exceeds the predetermined maximum value;

generating signals indicative of the refined profile for the first rotor and the refined profile for the second rotor; and producing the first and second rotors in accordance with the signals indicative of the refined profile and the signals indicative of the helix angles of the first and second rotors.

* * * * *